United States Patent
Shibata et al.

(10) Patent No.: US 6,941,022 B2
(45) Date of Patent: Sep. 6, 2005

(54) IMAGE CODING METHOD, IMAGE CODING AND DECODING METHOD, IMAGE CODING APPARATUS, AND IMAGE RECORDING AND REPRODUCTION APPARATUS

(75) Inventors: Hideaki Shibata, Osaka (JP); Hideki Fukuda, Nara (JP); Kazuhiko Nakamura, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/808,403

(22) Filed: Mar. 25, 2004

(65) Prior Publication Data

US 2004/0179743 A1 Sep. 16, 2004

Related U.S. Application Data

(62) Division of application No. 09/623,397, filed as application No. PCT/JP99/01093 on Mar. 5, 1999, now Pat. No. 6,792,152.

(30) Foreign Application Priority Data

Mar. 5, 1998 (JP) ............................................ 10-53217
Jun. 2, 1998 (JP) .......................................... 10-152454

(51) Int. Cl.$^7$ ............................................... G06K 9/36
(52) U.S. Cl. ..................................................... 382/239
(58) Field of Search ................................ 382/232, 239; 348/384.1, 397.1, 398.1, 404.1–405.1, 420.1–421.1, 424.2, 427.1, 431.1; 375/240, 240.02

(56) References Cited

U.S. PATENT DOCUMENTS

| | | | |
|---|---|---|---|
| 5,181,105 A | 1/1993 | Udagawa et al. |
| 5,398,078 A | 3/1995 | Masuda et al. |
| 5,440,344 A | 8/1995 | Asamura et al. |
| 5,542,008 A | 7/1996 | Sugahara et al. |
| 5,594,807 A | 1/1997 | Liu |
| 5,610,729 A | 3/1997 | Nakajima |
| 5,644,658 A | 7/1997 | Sugahara et al. |
| 5,719,962 A | 2/1998 | Sugahara et al. |
| 5,724,098 A | 3/1998 | Murakami et al. |
| 5,768,534 A | 6/1998 | Guillotel et al. |
| 5,835,237 A | 11/1998 | Ebrahimi |
| 5,917,943 A | 6/1999 | Washizawa |
| 5,960,097 A | 9/1999 | Pfeiffer et al. |
| 6,111,607 A | 8/2000 | Kameyama |
| 6,347,153 B1 | 2/2002 | Triplett et al. |
| RE37,668 E | 4/2002 | Etoh |
| 6,549,660 B1 | 4/2003 | Lipson et al. |

FOREIGN PATENT DOCUMENTS

| | | |
|---|---|---|
| EP | 0 444 918 A2 | 9/1991 |
| EP | 0 603 878 A2 | 6/1994 |
| EP | 0 659 020 A2 | 6/1995 |

(Continued)

Primary Examiner—Jose L. Couso
(74) Attorney, Agent, or Firm—Wenderoth, Lind & Ponack, L.L.P.

(57) ABSTRACT

An image coding apparatus is provided with a blocking circuit for dividing an input image signal into two-dimensional blocks each comprising plural pixels; a frequency distribution verifier for calculating the average and variance from a plurality of image feature data and the frequency distribution of each feature data for each block in a predetermined period; a filter characteristic decider, a filter circuit, and an encoder. The input image signal is divided into local regions each comprising plural pixels, the image feature data of each local region is extracted, the average and the variance of the extracted image feature data are calculated from the frequency distribution of the image feature data for a predetermined period, and a filter characteristic and a quantization step are decided for each local region according to the degree of singularity of each local region.

10 Claims, 17 Drawing Sheets

FOREIGN PATENT DOCUMENTS

| | | |
|---|---|---|
| EP | 0720375 | 7/1996 |
| EP | 0 772 365 A2 | 5/1997 |
| EP | 0 817 497 A2 | 1/1998 |
| GB | 2306846 | 5/1997 |
| JP | 63-111781 | 5/1988 |
| JP | 3-270388 | 12/1991 |
| JP | 5-227525 | 9/1993 |
| JP | 5-276391 | 10/1993 |
| JP | 6-054199 | 2/1994 |
| JP | 6-070299 | 3/1994 |
| JP | 6-225276 | 8/1994 |
| JP | 7-50832 | 2/1995 |
| JP | 8-84342 | 3/1996 |
| JP | 8-102968 | 4/1996 |
| JP | 9-018872 | 1/1997 |
| JP | 9-070044 | 3/1997 |
| JP | 9-200760 | 7/1997 |
| JP | 9-261073 | 10/1997 |
| WO | 88/10544 | 12/1988 | difference between block average luminance
level and frequency distribution average difference in average luminance levels difference in average chrominance levels difference in luminance variances number of pixels included in skin color region

IMAGE CODING METHOD, IMAGE CODING AND DECODING METHOD, IMAGE CODING APPARATUS, AND IMAGE RECORDING AND REPRODUCTION APPARATUS This application is a Division of Ser. No. 09/623,397 filed Oct. 27, 2000 now U.S. Pat. No. 6,792,152 which is a 371 of PCT/JP99/01093 filed Mar. 5, 1999.

TECHNICAL FIELD

The present invention relates to an image coding method, an image coding and decoding method, an image coding apparatus, and an image recording and reproduction apparatus and, more particularly, to those used for a system which codes a video signal with high efficiency and records it on an image recording medium such as an optical disk.

BACKGROUND ART

As a conventional system for coding a video signal with high efficiency and recording it, there has been known an image coding apparatus disclosed in Japanese Published Patent Application No. Hei. 9-18872.

FIG. 20 is a simplified block diagram of the conventional image coding apparatus. FIGS. 21 to 23 are diagrams of characteristics for deciding a quantization step by the conventional image coding apparatus. In each of FIGS. 21 to 23, the abscissa shows the size of each image feature data, and the ordinate shows the coefficient of quantization characteristic. The larger the coefficient is, the smaller the quantization step is. That is, the number of bits to be given is increased, and the quantity of generated codes is increased.

The construction and operation will be described with reference to FIG. 20. As shown in FIG. 20, the conventional image coding apparatus comprises an average luminance level extractor 2001 for extracting the average of the luminance signal for every predetermined period; an average chrominance level extractor 2002 for extracting the averages of the color-difference signals for every predetermined period; a luminance variance extractor 2003 for extracting the variance of the luminance signal for every predetermined period, a quantization step decider 2004, and an encoder 2005.

An image signal is input to the average luminance level extractor 2001, the average chrominance level extractor 2002, the luminance variance extractor 2003, and the encoder 2005. In the average luminance level extractor 2001, the average chrominance level extractor 2002, and the luminance variance extractor 2003, the respective image feature data are extracted from the input image signal over a predetermined period, and the extracted data are input to the quantization step decider 2004. The quantization step decider 2004 decides a quantization step according to at least one of these image feature data, and outputs the result to the encoder 2005. The encoder 2005 encodes the input image signal using the quantization step decided for every predetermined period by the quantization step decider 2004, and outputs it.

The quantization step decider 2004 operates as follows. When the average luminance level extracted by the average luminance level extractor 2001 is relatively small, the decider 2004 decreases the quantization step according to the characteristics shown in FIG. 21. Between two color-difference signals Cb and Cr extracted by the average chrominance level extractor 2002, when the average level of the red-base Cr signal is larger than that of the Cb signal, the decider 2004 decreases the quantization step according to the characteristics shown in FIG. 22. When the luminance variance extracted by the luminance variance extractor 2003 is relatively small, the decider 2004 decreases the quantization step according to the characteristics shown in FIG. 23. The coefficients at the ordinates of FIGS. 21 to 23 are weights on the quantization step. The larger the coefficient is, the smaller the quantization step is.

In this way, the quantization step is decided adaptively to the human visual characteristics, followed by coding.

As described above, in the conventional image coding apparatus, the quantization step is adaptively decided to the human visual characteristics by using the rough feature data of the image signal for every predetermined period, and then the image signal is coded. Therefore, when coding is performed according to the extracted image feature data to reduce image degradation, the quantity of generated codes is increased as a whole. On the contrary, when the quantity of generated codes is reduced, image degradation occurs over the entire image displayed in the predetermined period.

The present invention is made to solve the above-described problems and has for its object to provide an image coding method, an image coding and decoding apparatus, an image coding apparatus, and an image recording and reproduction apparatus, which are adapted to the human visual characteristics on the entire image, and reduce degradation of image quality while minimizing the influence on the quantity of generated codes.

DISCLOSURE OF INVENTION

According to one aspect of the present invention, there is provided an image coding method comprising: dividing an input image signal into local regions; deciding a quantization characteristic for each local region of the input image signal on the basis of the frequency distribution of image feature data of each local region over a predetermined period; and coding the image signal. Therefore, the quantity of generated codes in each local region can be precisely controlled, and occurrence of coding noise can be controlled, by utilizing the statistical data of the whole image.

According to a second aspect of the present invention, there is provided an image coding method comprising: dividing an input image signal into local regions; deciding a filter characteristic for each local region of the input image signal on the basis of image feature data of each local region; performing adaptive filtering; and coding the image signal. Since the noise component is locally suppressed or the frequency band is controlled by the adaptive filtering before coding, occurrence of coding noise and increase in the quantity of generated codes can be suppressed.

According to a third aspect of the present invention, there is provided an image coding method comprising: dividing an input image signal into local regions; deciding a filter characteristic for each local region of the input image signal on the basis of the frequency distribution of image feature data of each local region over a predetermined period; performing adaptive filtering; and coding the image signal. Since the noise component is locally suppressed or the frequency band is controlled before coding by the adaptive filtering utilizing the statistical data of the whole image, occurrence of coding noise and increase in the quantity of generated codes can be suppressed.

According to a fourth aspect of the present invention, in the image coding method of the first aspect, employed as an input image signal is a signal obtained by dividing an input image signal into local regions, deciding a filter characteristic for each local region of the input image signal on the basis of image feature data of each local region, and subjecting the image signal to adaptive filtering. Therefore, occurrence of coding noise and increase in the quantity of generated codes can be suppressed for each local region. Further, the quantity of generated codes can be precisely controlled for each local region, and occurrence of coding noise can be controlled.

According to a fifth aspect of the present invention, in the image coding method of the first aspect, employed as an input image signal is a signal obtained by dividing an input image signal into local regions, deciding a filter characteristic for each local region of the input image signal on the basis of the frequency distribution of image feature data of each local region over a predetermined period, and subjecting the image signal to adaptive filtering. Therefore, occurrence of coding noise and increase in the quantity of generated codes can be suppressed for each local region by utilizing the statistical data of the whole image. Further, the quantity of generated codes can be precisely controlled for each local region, and occurrence of coding noise can be controlled.

According to a sixth aspect of the present invention, there is provided an image coding method comprising: dividing an input image signal into plural regions; deciding a filter characteristic and a quantization characteristic for each local region of the input image signal on the basis of image feature data of each local region; subjecting the image signal to adaptive filtering; and coding the image signal on the basis of the quantization characteristic. Since only the image feature data of the image signal before being filtered is used, highspeed and simple processing is realized.

According to a seventh aspect of the present invention, there is provided an image coding method comprising: dividing an input image signal into local regions; deciding a filter characteristic for each local region of the input image signal on the basis of image feature data of each local region; subjecting the image signal to adaptive filtering; deciding a quantization characteristic for each local region according to the decided filter characteristic; and coding the image signal on the basis of the quantization characteristic. Since the quantization characteristic is decided according to the filter characteristic of each local region, quantization compensation according to the image signal changed by the filtering can be performed, whereby occurrence of coding noise can be suppressed.

According to an eighth aspect of the present invention, there is provided an image coding method comprising: dividing an input image signal into local regions; deciding a filter characteristic and a quantization characteristic for each local region of the input image signal on the basis of the frequency distribution of image feature data of each local region over a predetermined period; subjecting the image signal to adaptive filtering; and coding the image signal on the basis of the quantization characteristic. Since only the image feature data of the image signal before being filtered is used, high-speed and simple processing is realized.

According to a ninth aspect of the present invention, there is provided an image coding method comprising: dividing an input image signal into local regions; deciding a filter characteristic for each local region of the input image signal on the basis of the frequency distribution of image feature data of each local region over a predetermined period; subjecting the image signal to adaptive filtering; deciding a quantization characteristic for each local region according to the decided filter characteristic; and coding the image signal on the basis of the quantization characteristic. Since the quantization characteristic is decided according to the filter characteristic of each local region, quantization compensation according to the image signal changed by the filtering can be performed, whereby occurrence of coding noise can be suppressed.

According to a tenth aspect of the present invention, in the image coding method described in any of the first through ninth aspects, each of the filter characteristic and the quantization characteristic decided for each local region is compensated by comparison between itself and that obtained by averaging filter characteristics or quantization characteristics of plural local regions adjacent to the target local region. Therefore, occurrence of visual incompatibility caused by that the quality of decoded image varies greatly between adjacent local regions, is avoided.

According to an eleventh aspect of the present invention, in the image coding method described in any of the first through tenth aspects, the image feature data of each local region is at least one of the following data: the average of absolute difference in luminance signals between adjacent pixels, the average of absolute difference in color-difference signals between adjacent pixels, the value of average luminance signal, the value of average color-difference signal, the variance of luminance signal, the variance of color-difference signal, the value representing the amount of motion, and representative vector data in color space. Therefore, degradation of quality of decoded image in a singular region which attracts human eyes, can be suppressed.

According to a twelfth aspect of the present invention, in the image coding method described in any of the second through eleventh aspects, the filter characteristic is adaptively decided according to the image feature data of each local region and a control signal supplied from the outside. Therefore, the filter characteristic of the whole image can be controlled from the outside.

According to a thirteenth aspect of the present invention, in the image coding method described in the twelfth aspect, the control signal supplied from the outside is at least one of the following values: the accumulated value of absolute value of frame or field pixel difference over an N (N: natural number) frame period of the input image signal, the accumulated value of quantity of coded data over an M (M: natural number) frame period, and the ratio of quantity of coded data in each frame. Therefore, the original data quantity can be effectively reduced by the feature of the motion of the input image signal, whereby the quantity of generated codes can be suppressed.

According to a fourteenth aspect of the present invention, in the image coding method described in any of the first, third, fifth and eighth through thirteenth aspects, amongst the data used for decision of the quantization characteristic or the filter characteristic, the data of the frequency distribution of the image feature data is calculated a predetermined period before, for the image signal to be coded for each local region, in the same scene, and this operation is nullified when there is a change in the scene. Since the data of the frequency distribution of each image feature data calculated a predetermined period before is used, the quantization characteristic and filter characteristic for each block can be decided before verifying the frequency distribution of each image feature data, whereby the processing speed is increased.

According to a fifteenth aspect of the present invention, there is provided an image coding and decoding method for coding the image feature data of each local region as well, in the image coding method described in any of the first through fourteenth aspects, and this method further comprises: recording a coded data sequence; and, at the time of reproduction, decoding the coded data sequence, and subjecting each local region of the decoded image signal to adaptive filtering on the basis of the image feature data of the decoded local region. Therefore, the decoded image signal can be subjected to adaptive filtering without extracting the image feature data of each local region at reproduction, whereby coding noise is effectively suppressed, and the signal is enhanced.

According to a sixteenth aspect of the present invention, there is provided an image coding apparatus comprising: local region division means for dividing an input image signal into local regions each comprising plural pixels; first feature extraction means for extracting image feature data for each local region obtained by the local region division means; second feature extraction means for extracting the representative value and the variance of the image feature data from the frequency distribution of the image feature data over a predetermined period; quantization step decision means for deciding a quantization characteristic according to the data extracted by the first characteristic extraction means and the second characteristic extraction means; and coding means for coding the input image signal divided by the local region division means, on the basis of the quantization step decided by the quantization step decision means. Therefore, the quantity of generated codes in each local region can be precisely controlled, and occurrence of coding noise can be controlled, by utilizing the statistical data of the whole image.

According to a seventeenth aspect of the present invention, there is provided an image coding apparatus comprising: local region division means for dividing an input image signal into local regions each comprising plural pixels; first feature extraction means for extracting image feature data for each local region obtained by the local region division means; filter characteristic decision means for deciding a filter characteristic according to the data extracted by the first feature extraction means; filtering means for subjecting the image signal to adaptive filtering on the basis of the filter characteristic decided by the filter characteristic decision means; and coding means for coding the image signal which has been adaptively filtered for each local region by the filtering means. Since the noise component is locally suppressed or the frequency band is controlled by the adaptive filtering before coding, occurrence of coding noise and increase in the quantity of generated codes can be suppressed.

According to an eighteenth aspect of the present invention, there is provided an image coding apparatus comprising: local region division means for dividing an input image signal into local regions each comprising plural pixels; first feature extraction means for extracting image feature data for each local region obtained by the local region division means; second feature extraction means for extracting the representative value and the variance of the image feature data from the frequency distribution of the image feature data over a predetermined period; filter characteristic decision means for deciding a filter characteristic according to the data extracted by the first feature extraction means and the second feature extraction means; filtering means for subjecting the image signal to adaptive filtering on the basis of the filter characteristic decided by the filter characteristic decision means; and coding means for coding the image signal which has been adaptively filtered for each local region by the filtering means. Since the noise component is locally suppressed or the frequency band is controlled before coding by the adaptive filtering utilizing the statistical data of the whole image, occurrence of coding noise and increase in the quantity of generated codes can be suppressed.

According to a nineteenth aspect of the present invention, the image coding apparatus described in the sixteenth aspect further comprises: local region division means for dividing an input image signal into local regions each comprising plural pixels; first feature extraction means for extracting image feature data for each local region obtained by the local region division means; filter characteristic decision means for deciding a filter characteristic according to the data extracted by the first feature extraction means; and filtering means for subjecting the image signal to adaptive filtering on the basis of the filter characteristic decided by the filter characteristic decision means; wherein a signal which has been filtered by the filter means is used as an input image signal. Therefore, occurrence of coding noise and increase in the quantity of generated codes can be suppressed for each local region. Further, the quantity of generated codes can be precisely controlled for each local region, and occurrence of coding noise can be controlled.

According to a twentieth aspect of the present invention, the image coding apparatus described in the sixteenth aspect further comprises: local region division means for dividing an input image signal into local regions each comprising plural pixels; first feature extraction means for extracting image feature data for each local region obtained by the local region division means; second feature extraction means for extracting the representative value and the variance of the image feature data from the frequency distribution of the image feature data over a predetermined period; filter characteristic decision means for deciding a filter characteristic according to the data extracted by the first feature extraction means and the second feature extraction means; and filtering means for subjecting the image signal to adaptive filtering on the basis of the filter characteristic decided by the filter characteristic decision means; wherein a signal which has been filtered by the filtering means is used as an input image signal. Therefore, occurrence of coding noise and increase in the quantity of generated codes can be suppressed for each local region. Further, the quantity of generated codes can be precisely controlled for each local region, and occurrence of coding noise can be controlled.

According to a twenty-first aspect of the present invention, there is provided an image coding apparatus comprising: local region division means for dividing an input image signal into local regions each comprising plural pixels; first feature extraction means for extracting image feature data for each local region obtained by the local region division means; filter characteristic decision means for deciding a filter characteristic according to the data extracted by the first feature extraction means; filtering means for subjecting the image signal to adaptive filtering on the basis of the filter characteristic decided by the filter characteristic decision means; quantization step decision means for deciding a quantization characteristic according to the data extracted by the first feature extraction means; and coding means for coding the image signal which has been adaptively filtered for each local region by the filtering means, on the basis of the quantization step decided by the quantization step decision means. Since only the image feature data of the image signal before being filtered is used, high-speed and simple processing is realized.

According to a twenty-second aspect of the present invention, there is provided an image coding apparatus comprising: local region division means for dividing an input image signal into local regions each comprising plural pixels; first feature extraction means for extracting image feature data for each local region obtained by the local region division means; filter characteristic decision means for deciding a filter characteristic according to the data extracted by the first feature extraction means; filtering means for subjecting the image signal to adaptive filtering on the basis of the filter characteristic decided by the filter characteristic decision means; quantization step decision means for deciding a quantization characteristic according to the data decided by the filter characteristic decision means; and coding means for coding the image signal which has been adaptively filtered for each local region by the filtering means, on the basis of the quantization step decided by the quantization step decision means. Since the quantization characteristic is decided according to the filter characteristic of each local region, quantization compensation according to the image signal changed by the filtering can be performed, whereby occurrence of coding noise can be suppressed.

According to a twenty-third aspect of the present invention, there is provided an image coding apparatus comprising: local region division means for dividing an input signal into local regions each comprising plural pixels; first feature extraction means for extracting image feature data for each local region obtained by the local region division means; second feature extraction means for extracting the representative value and the variance of the image feature data from the frequency distribution of the image feature data over a predetermined period; filter characteristic decision means for deciding a filter characteristic according to the data extracted by the first feature extraction means and the second feature extraction means; filtering means for subjecting the image signal to adaptive filtering on the basis of the filter characteristic decided by the filter characteristic decision means; quantization step decision means for deciding a quantization characteristic according to the data extracted by the first feature extraction means and the second feature extraction means; and coding means for coding the image signal which has been adaptively filtered for each local region by the filtering means, on the basis of the quantization step decided by the quantization step decision means. Since only the image feature data of the image signal before being filtered is used, high-speed and simple processing is realized.

According to a twenty-fourth aspect of the present invention, there is provided an image coding apparatus comprising: local region division means for dividing an input signal into local regions each comprising plural pixels; first feature extraction means for extracting image feature data for each local region obtained by the local region division means; second feature extraction means for extracting the representative value and the variance of the image feature data from the frequency distribution of the image feature data over a predetermined period; filter characteristic decision means for deciding a filter characteristic according to the data extracted by the first feature extraction means and the second feature extraction means; filtering means for subjecting the image signal to adaptive filtering on the basis of the filter characteristic decided by the filter characteristic decision means; quantization step decision means for deciding a quantization characteristic according to the data decided by filter characteristic decision means; and coding means for coding the image signal which has been adaptively filtered for each local region by the filtering means, on the basis of the quantization step decided by the quantization step decision means. Since the quantization characteristic is decided according to the filter characteristic of each local region, quantization compensation according to the image signal changed by the filtering can be performed, whereby occurrence of coding noise can be suppressed.

According to a twenty-fifth aspect of the present invention, in the image coding apparatus described in any of the sixteenth through twenty-fourth aspects, each of the filter characteristic and the quantization characteristic which are decided for each local region by the filter characteristic decision means and the quantization step decision means, respectively, is compensated by comparison between itself and that obtained by averaging the filter characteristics or the quantization characteristics of plural local regions adjacent to the target local region. Therefore, occurrence of visual incompatibility caused by that the quality of decoded image varies greatly between adjacent local regions, is avoided.

According to a twenty-sixth aspect of the present invention, in the image coding apparatus described in any of the sixteenth through twenty-fifth aspects, the data extracted by the first feature extraction means is at least one of the following data: the average of absolute difference in luminance signals between adjacent pixels, the average of absolute difference in color-difference signals between adjacent pixels, the average luminance value, the average color-difference value, the variance of luminance signal, the variance of color-difference signal, the value representing the amount of motion, and the representative vector data in color space. Therefore, degradation of quality of decoded image in a singular region which attracts human eyes, can be suppressed.

According to a twenty-seventh aspect of the present invention, in the image coding apparatus described in any of the seventeenth through twenty-sixth aspects, the filter characteristic decision means adaptively decides the filter characteristic according to a control signal supplied from the outside as well as the data extracted from the first feature extraction means and the second feature extraction means. Therefore, the filter characteristic of the whole image can be controlled from the outside.

According to a twenty-eighth aspect of the present invention, in the image coding apparatus described in the twenty-seventh aspect, the control signal supplied from the outside is at least one of the following values: the accumulated value of absolute value of frame or field pixel difference over an N (N: natural number) frame period of the input image signal, the accumulated value of quantity of coded data over an M (M: natural number) frame period, and the ratio of quantity of coded data in each frame. Therefore, the original data quantity can be effectively reduced by the feature of the motion of the input image signal, whereby the quantity of generated codes can be suppressed.

According to a twenty-ninth aspect of the present invention, in the image coding apparatus described in any of the sixteenth, eighteenth through twentieth and twenty-third through twenty-eighth aspects, the data of the second feature extraction means to be input to the quantization step decision means or to the filter characteristic decision means is a predetermined period delayed from the data of the first feature extraction means in the same scene, and this operation is nullified when there is a change in the scene. Since the data of the frequency distribution of each image feature data calculated a predetermined period before is used, the quantization characteristic and filter characteristic for each block can be decided before verifying the frequency distribution of each image feature data, whereby the processing speed is increased, and the memory is reduced.

According to a thirtieth aspect of the present invention, there is provided an image recording and reproduction apparatus for quantizing and coding the input image signal divided into the local regions, and coding at least one of the data extracted by the first and second feature extraction means, in the coding means included in the image coding apparatus described in any of the sixteenth through twenty-ninth aspects, and this apparatus further comprises: recording means for recording a coded data sequence obtained by the coding means; reproduction means for reproducing the coded data sequence recorded by the recording means; decoding means for decoding the data extracted by the first or second feature extraction means and the quantized and coded image signal after separating them from the coded data sequence reproduced by the reproduction means, thereby obtaining the decoded feature data and the decoded image signal; and filtering means for subjecting each local region of the decoded image signal to adaptive filtering on the basis of the decoded feature data. Therefore, the decoded image signal can be subjected to adaptive filtering without extracting the image feature data of each local region at reproduction, whereby coding noise is effectively suppressed, and the signal is enhanced.

According to a thirty-first aspect of the present invention, there is provided an image coding method comprising: deciding a local quantization characteristic of an input image signal on the basis of image feature data of the input image signal for a predetermined period and the local image feature data of the input image signal; and coding the image signal. Therefore, precise control of coding rate is performed.

According to a thirty-second aspect of the present invention, there is provided an image coding method comprising: deciding a local filter characteristic of an input image signal on the basis of image feature data of the input image signal for a predetermined period and the local image feature data of the input image signal; subjecting the image signal to adaptive filtering; and coding the image signal. Since the noise component is locally suppressed or the frequency band is controlled by the adaptive filtering before coding, occurrence of coding noise and increase in the quantity of generated codes can be suppressed.

According to a thirty-third aspect of the present invention, in the image coding method described in any of the thirty-first and thirty-second aspects, the image feature data is at least one of the following data: the average luminance level, the representative vector data in the color space, and the luminance variance. Therefore, a region where coding noise is conspicuous can be locally reduced utilizing the human visual characteristics to each data, while minimizing the influence on the coding rate.

According to a thirty-fourth aspect of the present invention, in the image coding method described in the thirty-third aspect, the representative vector data in the color space is the data of average of each of the two color-difference signals possessed by pixels. Therefore, coding noise in a region of the whole image which attracts human eyes can be locally reduced.

According to a thirty-fifth aspect of the present invention, in the image coding method described in any of the thirty-first, thirty-third and thirty-fourth aspects, the local quantization characteristic of the input image signal is decided on the basis of a difference between the image feature data of the input image signal for the predetermined period and the local image feature data of the input image signal, and then the image signal is coded. Therefore, a region where coding noise is conspicuous can be locally reduced utilizing the human visual characteristics to each data, while minimizing the influence on the coding rate.

According to a thirty-sixth aspect of the present invention, in the image coding method described in any of the second, thirty-third and thirty-fourth aspects, the local filter characteristic of the input image signal is decided on the basis of the image feature data of the input image signal for predetermined period and the local image feature data of the input image signal, and the image signal is subjected to adaptive filtering, followed by coding. Therefore, the noise component included in a region where coding noise is conspicuous is locally suppressed before coding or the frequency bands of the region where coding noise is conspicuous and the other region are controlled, whereby increase in the coding rate and occurrence of coding noise are suppressed.

According to a thirty-seventh aspect of the present invention, in the image coding method described in any of the thirty-third and thirty-fourth aspects, the local filter characteristic of the input image signal is decided on the basis of a difference between the image feature data of the input image signal for the predetermined period and the local image feature data of the input image signal and on the luminance variance for the predetermined period, and the image signal is subjected to adaptive filtering, followed by coding. Therefore, the frequency band of a singular region of the input image which attracts human eyes is maintained as it is while the frequency band of the other region is limited, whereby generation of coding rate is suppressed.

According to a thirty-eighth aspect of the present invention, in the image coding method described in the thirty-third aspect, the representative vector data in the color space is the data of frequency at which color space vectors represented by the luminance signal and two color-difference signals possessed by pixels are within a predetermined range. Therefore, coding noise in a region of the whole image, which attracts human eyes, can be locally suppressed.

According to a thirty-ninth aspect of the present invention, in the image coding method described in the thirty-third aspect, the representative vector data in the color space is decided according to the data of average of each of the two color-difference signals possessed by pixels, and the data of frequency at which color space vectors represented by the luminance signal and two color-difference signals possessed by pixels are within a predetermined range. Therefore, coding noise in a region of the whole image, which attracts human eyes, can be locally suppressed.

According to a fortieth aspect of the present invention, in the image coding method described in any of the thirty-eighth and thirty-ninth aspects, the predetermined range in the color space is a region representing the skin color. Therefore, coding noise in the skin color region of the whole image, which attracts human eyes, can be locally suppressed.

According to a forty-first aspect of the present invention, there is provided an image coding apparatus comprising: blocking means for dividing an input image signal into blocks each comprising plural pixels; first feature extraction means for extracting a local feature for each divided block obtained by the blocking means; second feature extraction means for extracting a feature from the input image signal for every predetermined period; quantization step decision means for deciding a quantization characteristic according to the respective data extracted by the first feature extraction means and the second feature extraction means; and coding means for coding the input image signal blocked by the blocking means, on the basis of the quantization step decided by the quantization step decision means. Therefore, precise control of coding rate can be performed.

According to a forty-second aspect of the present invention, there is provided an image coding apparatus comprising: blocking means for dividing an input image signal into blocks each comprising plural pixels; first feature extraction means for extracting a local feature for each divided block obtained by the blocking means; second feature extraction means for extracting a feature from the input image signal for every predetermined period; filter characteristic decision means for deciding a filter characteristic according to the respective data extracted by the first feature extraction means and the second feature extraction means; filtering means for subjecting the image signal to adaptive filtering on the basis of the filter characteristic decided by the filter characteristic decision means; and coding means for coding the image signal which has been adaptively filtered for each block by the filtering means. Since the noise component is locally suppressed or the frequency band is controlled by the adaptive filtering before coding, occurrence of coding noise and increase in the quantity of generated codes can be suppressed.

According to a forty-third aspect of the present invention, in the image coding apparatus described in any of the forty-first and forty-second aspects, the data extracted by the first feature extraction means and the second feature extraction means are at least one of the following data: the average luminance level, the representative vector data in the color space, and the luminance variance. Therefore, a region where coding noise is conspicuous can be locally reduced utilizing the human visual characteristics to each data, while minimizing the influence on the coding rate.

According to a forty-fourth aspect of the present invention, in the image coding apparatus described in the forty-third aspect, the representative vector data in the color space is the data of average of each of the two color-difference signals possessed by pixels. Therefore, coding noise in a region of the whole image, which attracts human eyes, can be locally suppressed.

According to a forty-fifth aspect of the present invention, in the image coding apparatus described in any of the forty-first, forty-third and forty-fourth aspects, the quantization step decision means decides the quantization step according to a difference between the data extracted by the first feature extraction means and the data extracted by the second feature extraction means. Therefore, a region where coding noise is conspicuous can be locally reduced utilizing the human visual characteristics to each data, while minimizing the influence on the coding rate.

According to a forty-sixth aspect of the present invention, in the image coding apparatus described in any of the forty-second, forty-third and forty-fourth aspects, the filter characteristic decision means decides the filter characteristic according to a difference between the data extracted by the first feature extraction means and the data extracted by the second feature extraction means. Therefore, the noise component included in a region where coding noise is conspicuous is locally suppressed before coding or the frequency bands of the region where coding noise is conspicuous and the other region are controlled, whereby increase in the coding rate and occurrence of coding noise are suppressed.

According to a forty-seventh aspect of the present invention, in the image coding apparatus described in any of the forty-third and forty-fourth aspects, the filter characteristic decision means decides the filter characteristic according to a difference between the data extracted by the first feature extraction means and the data extracted by the second feature extraction means, and the luminance variance for every predetermined period. Therefore, the frequency band of a singular region of the input image signal which attracts human eyes is maintained as it is while the frequency band of the other region is limited, whereby generation of coding rate is suppressed.

According to a forty-eighth aspect of the present invention, in the image coding apparatus described in the forty-third aspect, the representative vector data in the color space is the data of frequency at which color space vectors represented by the luminance signal and two color-difference signals possessed by pixels are within a predetermined range. Therefore, coding noise in a region of the whole image, which attracts human eyes, can be locally suppressed.

According to a forty-ninth aspect of the present invention, in the image coding apparatus described in the forty-third aspect, the representative vector data on the color space is decided according to the data of average of each of the two color-difference signals possessed by pixels, and the data of frequency at which color space vectors represented by the luminance signal and two color-difference signals possessed by pixels are within a predetermined period. Therefore, coding noise in a region of the whole image, which attracts human eyes, can be locally suppressed.

According to a fiftieth aspect of the present invention, in the image coding apparatus described in any of the forty-eighth and forty-ninth aspects, the predetermined range in the color space is a region representing the skin color. Therefore, coding noise in the skin color region of the whole image, which attracts human eyes, can be locally suppressed.

According to a fifty-first aspect of the present invention, in the image coding method described in the eleventh aspect, the representative vector data in the color space is the data of frequency at which color space vectors represented by the luminance signal and two color-difference signals possessed by pixels are within a predetermined range. Therefore, coding noise in a region of the whole image, which attracts human eyes, can be locally suppressed.

According to a fifty-second aspect of the present invention, in the image coding method described in the eleventh aspect, the representative vector data in the color space is decided according to the data of average of each of the two color-difference signals possessed by pixels, and the data of frequency at which color space vectors represented by the luminance signal and two color-difference signals possessed by pixels are within a predetermined range. Therefore, coding noise in a region of the whole image, which attracts human eyes, can be locally suppressed.

According to a fifty-third aspect of the present invention, in the image coding method described in any of the fifty-first and fifty-second aspects, the predetermined range in the color space is a region representing the skin color. Therefore, coding noise in the skin color region of the whole image, which attracts human eyes, can be locally suppressed.

According to a fifty-fourth aspect of the present invention, in the image coding apparatus described in the twenty-sixth aspect, the representative vector data in the color space is the data of frequency at which color space vectors represented by the luminance signal and two color-difference signals possessed by pixels are within a predetermined range.

Therefore, coding noise in a region of the whole image, which attracts human eyes, can be locally suppressed.

According to a fifty-fifth aspect of the present invention, in the image coding apparatus described in the twenty-sixth aspect, the representative vector data in the color space is decided according to the data of average of each of the two color-difference signals possessed by pixels, and the data of frequency at which color space vectors represented by the luminance signal and two color-difference signals possessed by pixels are within a predetermined range. Therefore, coding noise in a region of the whole image, which attracts human eyes, can be locally suppressed.

According to a fifty-sixth aspect of the present invention, in the image coding apparatus described in any of the fifty-fourth and fifty-fifth aspects, the predetermined range in the color space is a region representing the skin color. Therefore, coding noise in the skin color region of the whole image, which attracts human eyes, can be locally suppressed.

BEST MODE TO EXECUTE THE INVENTION

Embodiment 1.

Hereinafter, a first embodiment of the present invention which corresponds to the first aspect and the sixteenth aspect will be described with reference to FIGS. 1 to 3.

Figure 1:
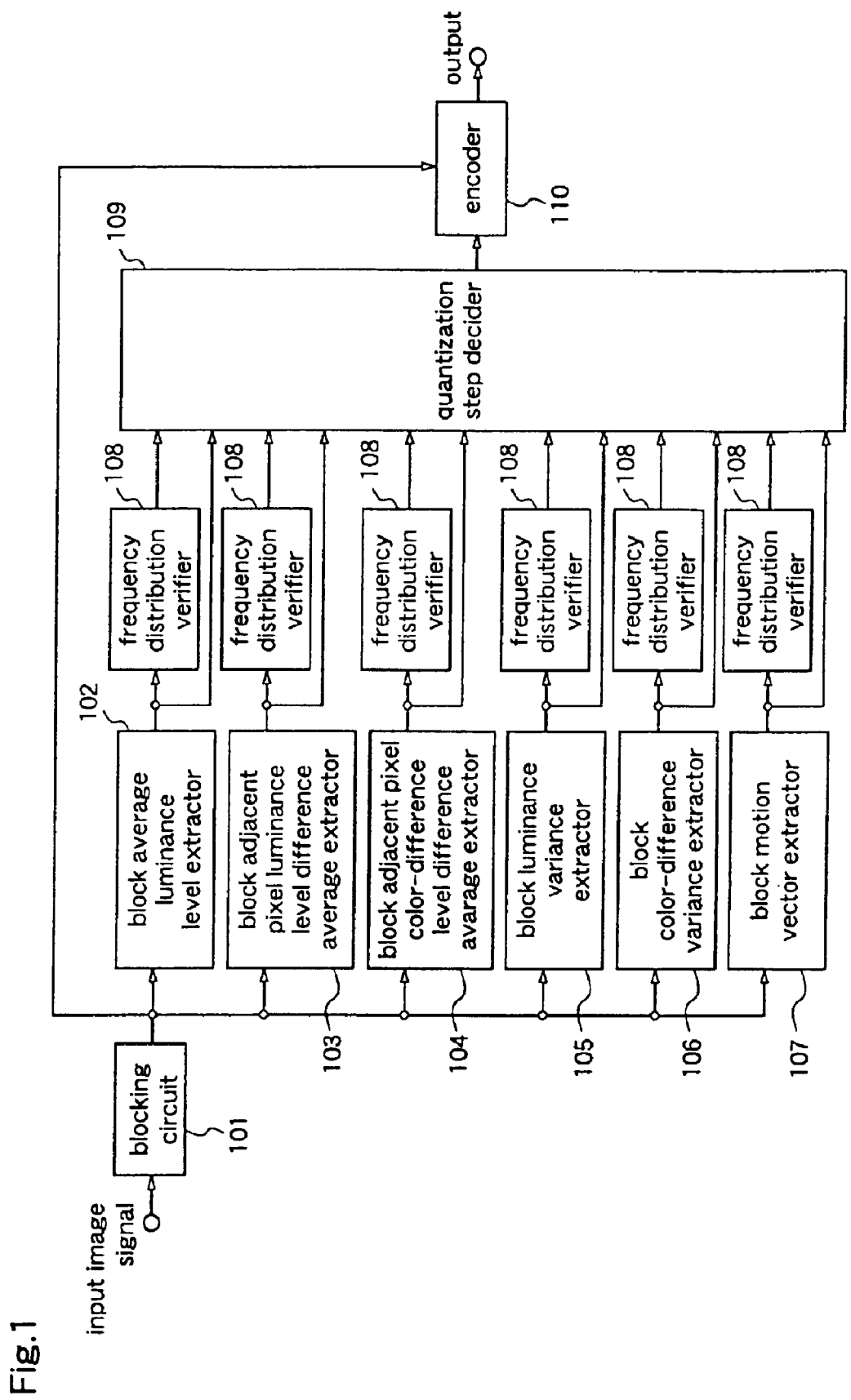
FIG. 1 is a block diagram illustrating an image coding apparatus according to a first embodiment of the present invention.

FIG. 1 is a block diagram illustrating an image coding apparatus to which the first embodiment of the present invention is applied.

As shown in FIG. 1, the image coding apparatus of this first embodiment comprises a blocking circuit 101 for dividing an input image signal into a plurality of two-dimensional blocks each comprising a plurality of pixels; a block average luminance level extractor 102 for extracting the average luminance level of each blocked region; a block adjacent pixel luminance level difference average extractor 103 for extracting the average of absolute difference in luminance levels between adjacent pixels in each blocked region; a block adjacent pixel color-difference level difference average extractor 104 for extracting the average of absolute difference in color-difference levels between adjacent pixels in each blocked region; a block luminance variance extractor 105 for extracting the luminance level variance of each blocked region; a block color-difference variance extractor 106 for extracting the color-difference level variance of each blocked region; a block motion vector extractor for extracting a value representing the motion vector of each blocked region; a frequency distribution verifier 108 for calculating the average and variance of each feature data from the frequency distribution of the feature data for each block over a predetermined period; a quantization step decider 109; and an encoder 110.

Hereinafter, the operation will be described in detail with reference to FIG. 1.

An input image signal is divided into sub-blocks each comprising, for example, 16×16 pixels, by the blocking circuit 101.

The image signal blocked by the blocking circuit 101 is input to the block average luminance level extractor 102, the block adjacent pixel luminance level difference average extractor 103, the block adjacent pixel color-difference level difference average extractor 104, the block luminance variance extractor 105, the block color-difference variance extractor 106, the block motion vector extractor 107, and the encoder 110.

The average luminance level, the average of absolute difference in luminance levels between adjacent pixels in the horizontal and vertical directions, the average of absolute difference in color-difference levels between adjacent pixels in the horizontal and vertical directions, the luminance variance, the color-difference variance, and the representative value of motion vector are extracted for each divided block in the block average luminance level extractor 102, the block adjacent pixel luminance level difference average extractor 103, the block adjacent pixel color-difference level difference average extractor 104, the block luminance variance extractor 105, the block color-difference variance extractor 106, and the block motion vector extractor 107, respectively. Further, although it is not shown in the figure, representative vector data in the color space is extracted. An extractor may be provided to extract the representative vector data in the color space. The representative vector data in the color space may be frequency data at which the color-space vector expressed by the luminance signal and two color-difference signals possessed by each pixel belongs to a predetermined range. Alternatively, it may be decided on the basis of the average data of each of the two color-difference signals possessed by each pixel, and the frequency data at which the color-space vector expressed by the luminance signal and two color-difference signals possessed by each pixel belongs to a predetermined range.

The image feature data so extracted are input to the frequency distribution verifier 108 and to the quantization step decider 109.

As the difference in luminance or color-difference levels between adjacent pixels, the following values are employed: the absolute value of difference in luminance or color-difference levels between adjacent pixels in the horizontal direction, the absolute value of difference in luminance or color-difference levels between the adjacent pixels in the vertical direction, or the sum of the absolute values of the level differences in both the horizontal and vertical directions.

Further, as the representative indicating the motion vector, for example, the block average of absolute difference in the luminance or color-difference levels between adjacent pixels in the vertical direction may be used.

The frequency distribution verifier 108 obtains the frequency distribution of each image feature data over a predetermined period of the image feature data, for example, one frame period of the image signal, and calculates the average and variance.

The variance is the degree of variation in the frequency distribution, such as standard deviation.

Figure 2:
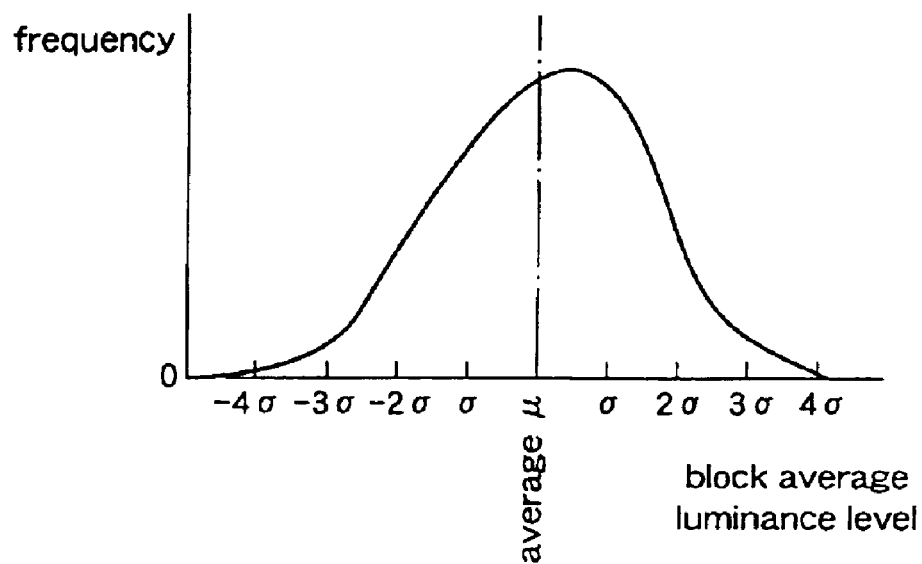
FIG. 2 is a characteristic diagram illustrating the frequency distribution of average luminance levels extracted block by block.

FIG. 2 shows an example of frequency distribution with respect to the block average luminance level.

In FIG. 2, $\sigma$ shows the standard deviation. The calculated average $\mu$ and variance $\sigma$ for one frame period of each image feature data are input to the quantization step decider 109.

The quantization step decider 109 decides a quantization step for each block by using the image feature data of each block, and its average $\mu$ and variance $\sigma$ for one frame period, and outputs it to the encoder 110. The encoder 110 encodes the blocked image signal according to the quantization step decided by the quantization step decider 109.

Hereinafter, the specific operation of the quantization step decider 109 will be described in due order.

Although six kinds of image feature data are shown in FIG. 1, the block average luminance level will be described as an example to simplify the description.

Figure 3:
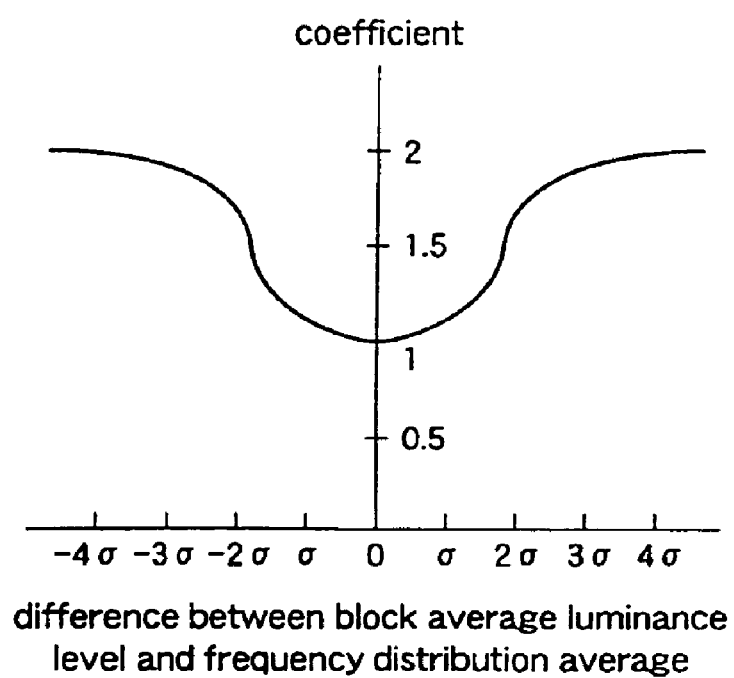
FIG. 3 is a characteristic diagram illustrating the quantization characteristic and the filter characteristic with respect to a difference between the average luminance level extracted for each block and the average of its frequency distribution.

FIG. 3 shows an example of the quantization characteristic, wherein the abscissa shows the difference between the average luminance level extracted for each block and the average of frequency distribution, and the ordinate shows the coefficient of quantization characteristic. The larger the coefficient is, the smaller the quantization step is. That is, the number of bits to be given is increased, and the coding rate is reduced, whereby the coding noise is reduced.

As shown in FIG. 3, as the average luminance level extracted for each block is going away from the feature of the whole image (i.e., the average $\mu$ in one frame period) according to the variance $\sigma$, the quantization coefficient becomes larger.

That is, the quantization step is decided so that a block whose luminance level is more singular to the whole image has a smaller quantization step. As the result, the coding noise generated in the decoded image of this block is suppressed as compared with those in other blocks.

The quantization step decider 109 operates in like manner as described above, for the remaining five kinds of image feature data. When plural kinds of data are used at the same time, since the singularity of each data can be obtained for each block, a block which is singular with respect to any data can be obtained by taking the logical sum of all singularities. Alternatively, by taking the logical product, a block having a very high singularity can be detected. The higher the singularity is, the more the noise in the decoded image is suppressed when deciding the quantization characteristic.

As described above, according to the first embodiment, an input image signal is divided into a plurality of local regions, and a quantization characteristic is decided for each local region of the input image signal on the basis of the frequency distribution of image feature data over a predetermined period of the data in each logical region, followed by coding. Therefore, precise control of the quantity of generated codes in each local region and control of generation of coding noise can be performed by utilizing the statistical data of the whole image obtained by observing the feature of each local region of the image.

Embodiment 2.

Hereinafter, a second embodiment of the present invention corresponding to the second, third, seventeenth and eighteenth embodiments will be described with reference to FIGS. 2 to 4.

Figure 4:
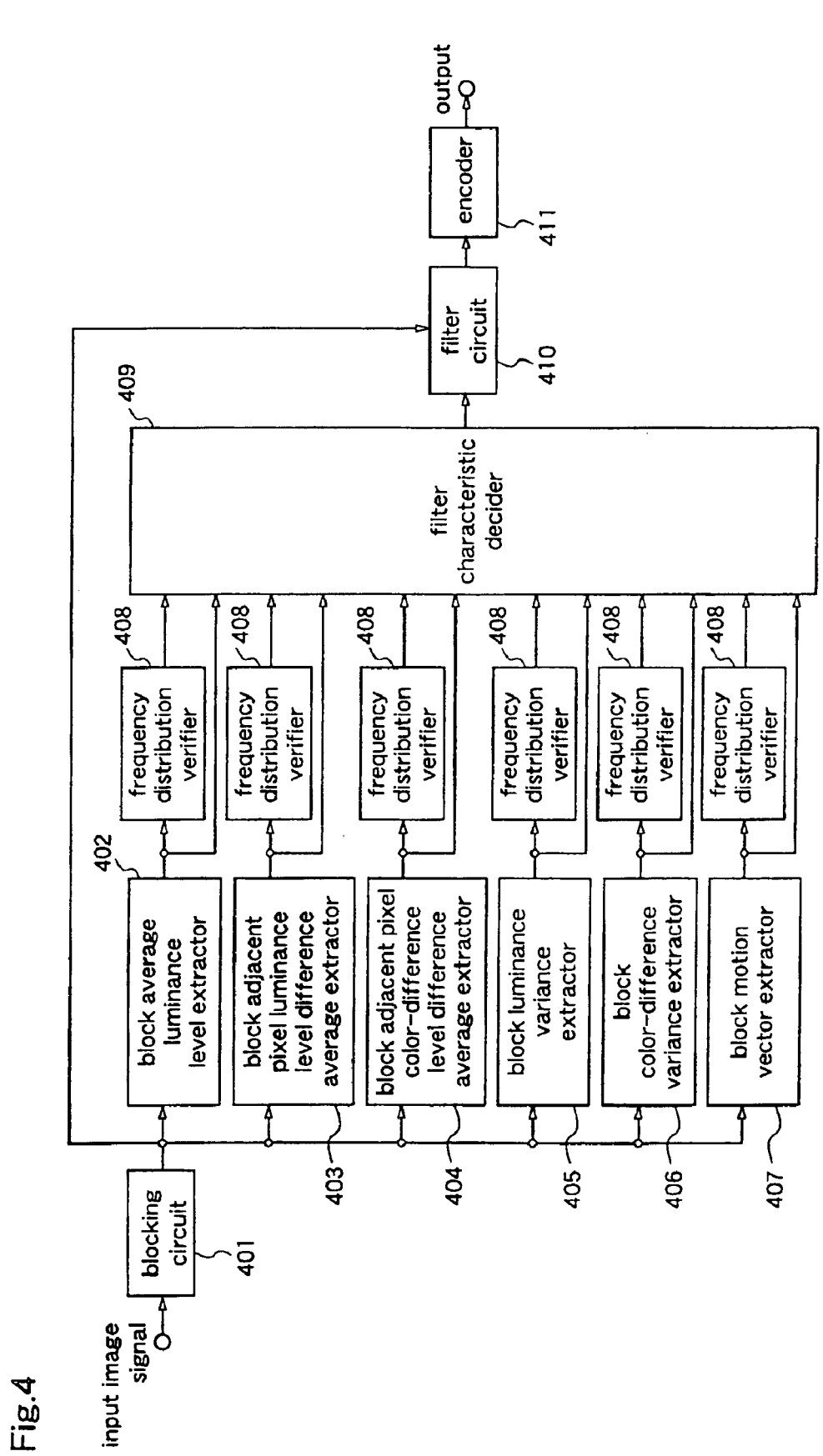
FIG. 4 is a block diagram illustrating an image coding apparatus according to a second embodiment of the present invention.

FIG. 4 is a block diagram illustrating an image coding apparatus to which the second embodiment of the present invention is applied.

As shown in FIG. 4, the image coding apparatus of this second embodiment comprises a blocking circuit 401 for dividing an input image signal into a plurality of two-dimensional blocks each comprising a plurality of pixels; a block average luminance level extractor 402 for extracting the average luminance level of each blocked region; a block adjacent pixel luminance level difference average extractor 403 for extracting the average of absolute difference in luminance levels between adjacent pixels in each blocked region; a block adjacent pixel color-difference level difference average extractor 404 for extracting the average of absolute difference in color-difference levels between adjacent pixels in each blocked region; a block luminance variance extractor 405 for extracting the luminance level variance of each blocked region; a block color-difference variance extractor 406 for extracting the color-difference variance of each blocked region; a block motion vector extractor 407 for extracting a value representing the motion vector of each blocked region (like the first embodiment, an extractor for extracting the representative vector data in the color space may be provided); frequency distribution verifiers 408 each for calculating the average and variance of each feature data from the frequency distribution over a predetermined period, of the feature data in each block; a filter characteristic decider 409; a filter circuit 410; and an encoder 411.

The operation will be described in detail with reference FIG. 4.

In this second embodiment, the process steps of extracting the six kinds of image feature data, obtaining the frequency distribution of each data over one frame period, and calculating the average $\mu$ and variance $\sigma$, are identical to those already described for the first embodiment of the invention and, therefore, do not require repeated description.

In FIG. 4, the six kinds of image feature data extracted block by block, and the averages $\mu$ and variances $\sigma$ outputted from the respective frequency distribution verifiers 408 are input to the filter characteristic decider 409.

The filter characteristic decider 409 decides the filter characteristic for each block on the basis of the image feature data of each block, and the average $\mu$ and variance $\sigma$ of the frequency distribution, and outputs it to the filter circuit 410.

The filter circuit 410 filters the image signal by adaptively changing the filter characteristic for each block, according to the filter characteristic decided by the filter characteristic decider 409, and outputs the filtered image signal to the encoder 411. The encoder 411 encodes the filtered image signal and outputs it.

Next, the specific operation of the filter characteristic decider 409 will be described in due order. To simplify the description, the block average luminance level is taken as an example of image feature data.

Further, FIGS. 2 and 3, which are used as diagrams to explain the quantization characteristic in the first embodiment, will be used as diagrams to explain the filter characteristic, and a frequency band-limited filter will be described as an example of a filter.

That is, in FIG. 3, the ordinate shows the coefficient of the filter characteristic. The smaller the coefficient is, the narrower the limited frequency band is.

As shown in FIG. 3, the filter characteristic is decided so that the filter coefficient increases as the average luminance level extracted for each block is going away from the feature of the whole image (i.e., the average $\mu$ in one frame period) according to the variance $\sigma$.

That is, the filter characteristic is decided so that a block whose luminance level is more singular to the whole image is subjected to broader limitation of frequency band by the filter.

The image coding apparatus operates in like manner as described above for the remaining five kinds of image feature data. When plural kinds of data are used at the same time, since the singularity of each data can be obtained for each block, a block which is singular with respect to any data can be obtained by taking the logical sum of all singularities. Alternatively, by taking the logical product, a block having a very high singularity can be detected. The filter characteristic is decided so that the frequency band limitation is eased as the singularity becomes higher.

As described above, according to the second embodiment, an input image signal is divided into a plurality of local regions, and a filter characteristic is decided for each local region of the input image signal on the basis of the image feature data of each local region or the frequency distribution of the image feature data of each local region over a predetermined period and, thereafter, adaptive filtering is carried out, followed by coding. Therefore, the noise components can be locally reduced before encoding by adaptive filtering, or the noise components can be locally reduced before encoding by controlling the frequency band or by performing adaptive filtering using the statistical data of the whole image. Further, generation of coding noise and increase in the quantity of generated codes can be reduced by controlling the frequency band.

Embodiment 3.

Hereinafter, a third embodiment of the present invention corresponding to the fourth through sixth and nineteenth through twenty-first aspects will be described with reference to FIG. 5.

Figure 5:
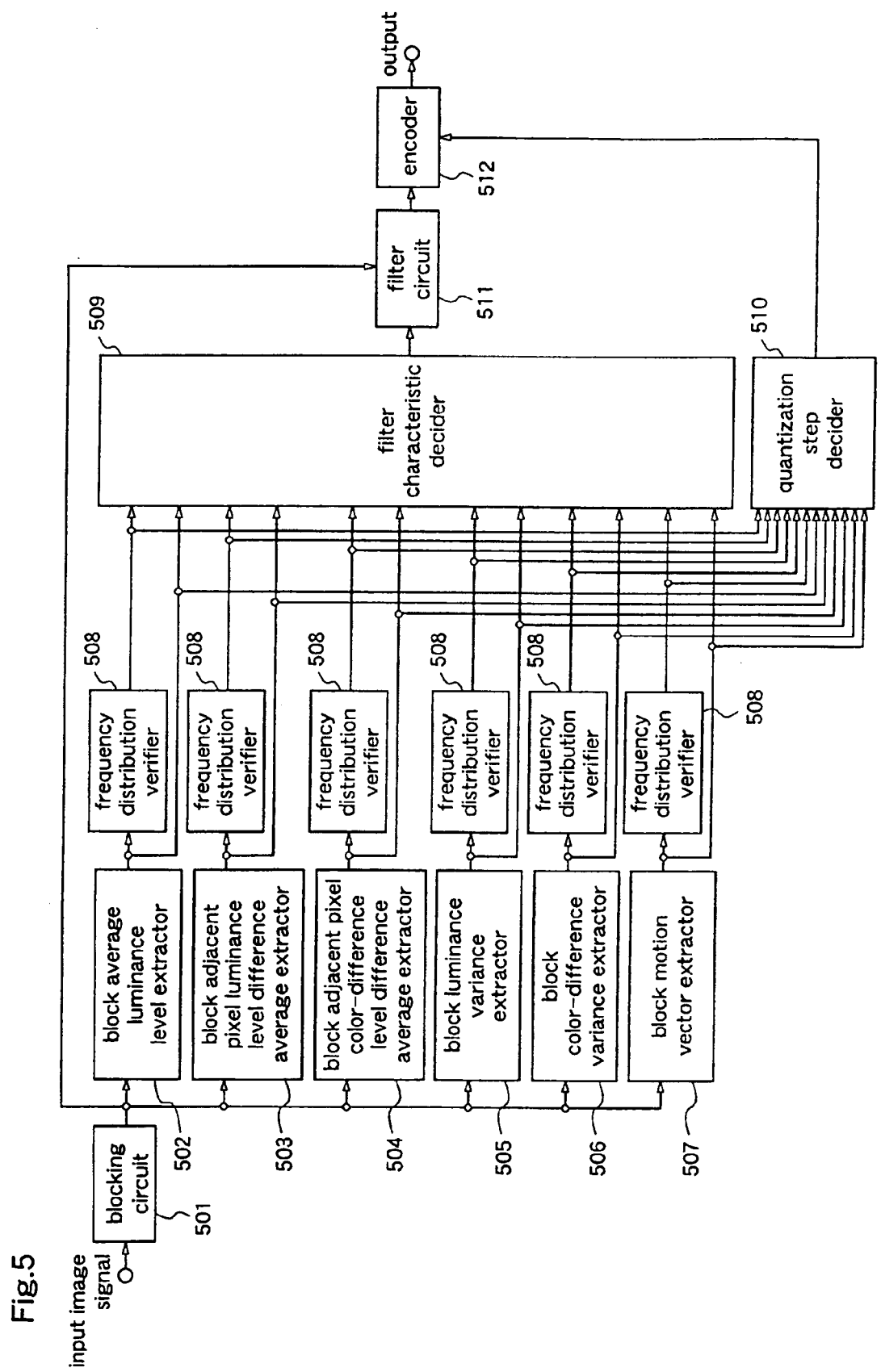
FIG. 5 is a block diagram illustrating an image coding apparatus according to a third embodiment of the present invention.

FIG. 5 is a block diagram illustrating an image coding apparatus to which the third embodiment of the present invention is applied.

As shown in FIG. 5, the image coding apparatus of this third embodiment comprises a blocking circuit 501 for dividing an input image signal into a plurality of two-dimensional blocks each comprising a plurality of pixels; a block average luminance level extractor 502 for extracting the average luminance level of each blocked region; a block adjacent pixel luminance level difference average extractor 503 for extracting the average of absolute difference in luminance levels between adjacent pixels in each blocked region; a block adjacent pixel color-difference level difference average extractor 504 for extracting the average of absolute difference in color-difference levels between adjacent pixels in each blocked region; a block luminance variance extractor 505 for extracting the luminance level variance of each blocked region; a block color-difference variance extractor 506 for extracting the color-difference variance of each blocked region; a block motion vector extractor 507 for extracting a value representing the motion vector of each blocked region; frequency distribution verifiers 508 each for calculating the average and variance of each feature data from the frequency distribution over a predetermined period, of each feature data in each block; a filter characteristic decider 509; a quantization step decider 510; a filter circuit 511; and an encoder 512.

The operation of the image coding apparatus will be described in detail with reference to FIG. 5.

In this third embodiment, the process steps of extracting the six kinds of image feature data, obtaining the frequency distribution of each data over one frame period, calculating its average $\mu$ and variance $\sigma$, filtering the data of each block by adaptively changing the filter characteristic, outputting the filtered image signal to the encoder 512, and deciding the quantization step for each block and outputting it to the encoder 512, are identical to those described for the first and second embodiment and, therefore, do not require repeated description.

With reference to FIG. 5, the image signal which has been adaptively filtered block by block by the filter circuit 511, is encoded by the encoder 512 according to the quantization step decided for each block.

In this third embodiment, since the image signal for deciding the quantization step for each block by the quantization step decider 510 is different from the image signal which has been subjected to filtering adapted to each block to be actually encoded by the encoder 512, there is a problem that the image feature data of the former image signal is different from that of the latter image signal. However, sharing of hardware or high-speed processing is achieved.

As described above, according to the third embodiment, an input image signal is divided into local regions, and the filter characteristic and the quantization characteristic are decided for each local region of the input image signal on the basis of the image feature data of each local region and its frequency distribution over a predetermined period. Then, each local region is subjected to adaptive filtering and, thereafter, encoded according to the quantization characteristic. Since the image feature data of only the image signal before being encoded is used to decide the filter characteristic and the quantization characteristic, high-speed and simple processing is achieved.

Embodiment 4.

Hereinafter, a fourth embodiment of the present invention corresponding to the fourth, fifth, seventh, nineteenth, twentieth and twenty-second aspects will be described with reference to FIG. 6.

Figure 6:
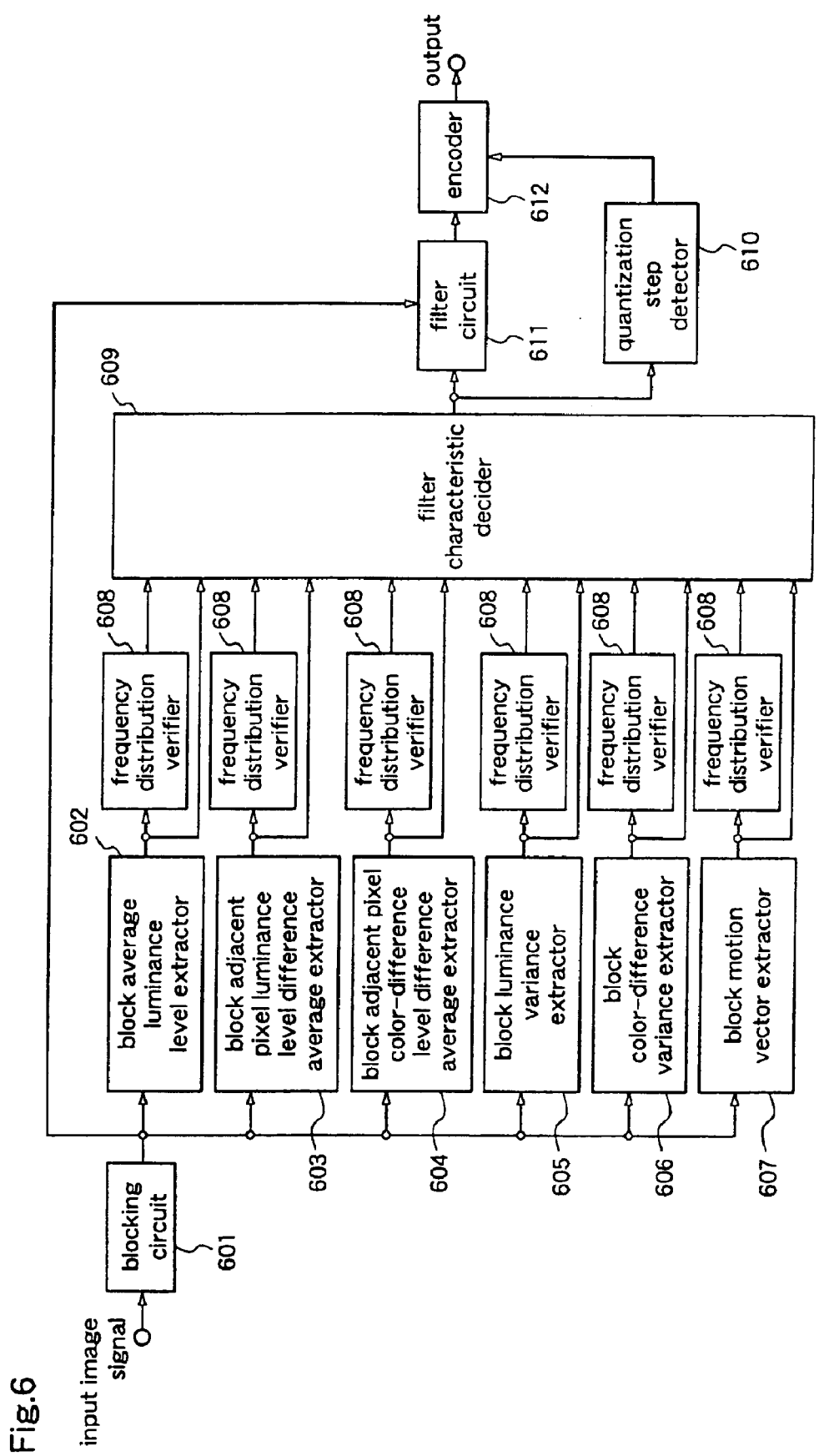
FIG. 6 is a block diagram illustrating an image coding apparatus according to a fourth embodiment of the present invention.

FIG. 6 is a block diagram illustrating an image coding apparatus to which the fourth embodiment of the invention is applied.

As shown in FIG. 6, the image coding apparatus of this fourth embodiment comprises a blocking circuit 601 for dividing an input image signal into a plurality of two-dimensional blocks each comprising a plurality of pixels; a block average luminance level extractor 602 for extracting the average luminance level of each blocked region; a block adjacent pixel luminance level difference average extractor 603 for extracting the average of the absolute difference in luminance levels between adjacent pixels in each blocked region; a block adjacent pixel color-difference level difference average extractor 604 for extracting the average of absolute difference in color-difference levels between adjacent pixels in each blocked region; a block luminance variance extractor 605 for extracting the luminance level variance of each blocked region; a block color-difference variance extractor 606 for extracting the color-difference variance of each blocked region; a block motion vector extractor 607 for extracting a value representing the motion vector of each blocked region; frequency distribution verifiers 608 each for calculating the average and variance from the frequency distribution over a predetermined period, of each characteristic data for each block; a filter characteristic decider 609; a quantization step decider 610; a filter circuit 611; and an encoder 612.

The operation of the image coding apparatus will be described with reference to FIG. 6.

In this fourth embodiment, the process steps of extracting the six kinds of image feature data, obtaining the frequency distribution of each data over one frame period, calculating its average $\mu$ and variance $\sigma$, performing filtering by adaptively changing the filter characteristic for each block, and outputting the filtered image signal to the encoder 612, are identical to those described for the second embodiment of the invention and, therefore, do not require repeated description.

In FIG. 6, the filter characteristic decided for each block by the filter characteristic decider 609 is input to the filter circuit 611 and, on the other hand it is also input to the quantization step decider 610. The quantization step decider 610 compensates the quantization step for each block on the basis of the filter characteristic decided for each block, and outputs the quantization data to the encoder 612.

For example, when the filter constituting the filter circuit 611 is a frequency band limited filter, the narrower the frequency band to be limited is, the lesser the high-band components included in each block are. Therefore, the signal amplitude is reduced as compared with that of the original signal.

The degree of distortion which occurs when the original signal and the band-limited signal are quantized with the same quantization step, is larger in the band-limited signal than in the original signal, resulting in degradation of image quality.

Accordingly, the quantization step is compensated by the quantization step decider so that the quantization step becomes smaller as the frequency band limited by the filter circuit 611 becomes narrower.

The encoder 612 quantizes the signal which has been adaptively filtered block by block, on the basis of the quantization step compensated and decided by the quantization step decider 610, thereby encoding the signal.

As described above, according to the fourth embodiment of the invention, an input image signal is divided into a plurality of local regions, and the filter characteristic is decided for each local region of the input image signal on the basis of the image feature data of each local region and the frequency distribution of the image feature data over a predetermined period, and then each local region is subjected to adaptable filtering. Thereafter, the quantization characteristic of each local region is decided according to the filter characteristic decided for each local region. Since the quantization characteristic is decided according to the filter characteristic decided for each local region, the quantization step can be compensated according to the image signal which is changed by filtering, whereby generation of coding noise is suppressed.

Embodiment 5.

Hereinafter, a fifth embodiment of the present invention corresponding to the eighth and twenty-third aspects will be described with reference to FIG. 7.

Figure 7:
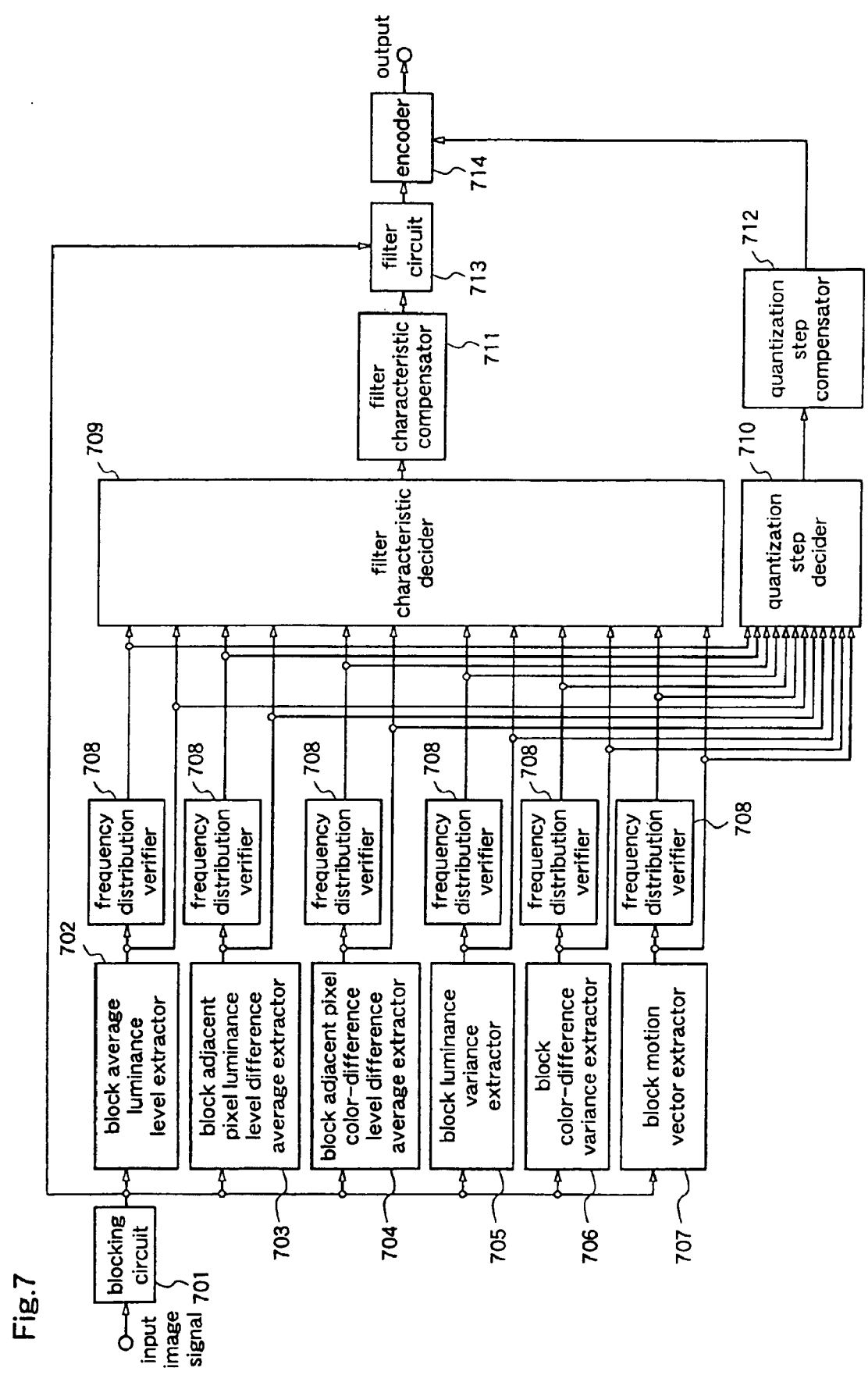
FIG. 7 is a block diagram illustrating an image coding apparatus according to a fifth embodiment of the present invention.

FIG. 7 is a block diagram illustrating an image coding apparatus to which the fifth embodiment of the invention is applied.

As shown in FIG. 7, the image coding apparatus of this fifth embodiment comprises a blocking circuit 701 for dividing an input image signal into a plurality of two-dimensional blocks each comprising a plurality of pixels; a block average luminance level extractor 702 for extracting the average luminance level of each blocked region; a block adjacent pixel luminance level difference average extractor 703 for extracting the average of absolute difference in luminance levels between adjacent pixels in each blocked region; a block adjacent pixel color-difference level difference average extractor 704 for extracting the average of absolute difference in color-difference levels between adjacent pixels in each blocked region; a block luminance variance extractor 705 for extracting the luminance level variance of each blocked region; a block color-difference variance extractor 706 for extracting the color-difference variance of each blocked region; a block motion vector extractor 707 for extracting a value representing the motion vector of each blocked region; frequency distribution verifiers 708 each for calculating the average and variance from the frequency distribution over a predetermined period, of each characteristic data of each block; a filter characteristic decider 709; a quantization step decider 710; a filter characteristic compensator 711, a quantization step compensator 712, a filter circuit 713, and an encoder 714.

The operation of the image coding apparatus will be described in detail with reference to FIG. 7.

The process steps of deciding the filter characteristic of each block by the filter characteristic decider 709 and deciding the quantization step of each block by the quantization step decider 710 are identical to those described for the third embodiment.

In FIG. 7, the filter characteristic decided for each block by the filter characteristic decider 709 is input to the filter characteristic compensator 711.

In the filter characteristic compensator 711, the average of the target block to be processed and eight blocks in the vicinity of the target block is calculated, and this value is compared with the original characteristic supplied from the filter characteristic decider 709, and the filter characteristic having the larger coefficient shown in FIG. 3, i.e., the filter characteristic providing the broader frequency band limitation, is selected to be output to the filter circuit 713. Likewise, the quantization characteristic decided for each block by the quantization step decider 710 is input to the quantization characteristic (quantization step) compensator 712. In the quantization characteristic compensator 712, the average of the target block and eight blocks in the vicinity of the target block is calculated, and this value is compared with the original characteristic supplied from the quantization characteristic decider 710, and the quantization characteristic having the larger coefficient shown in FIG. 3, i.e., the characteristic providing the smaller quantization step, is selected to be output to the encoder 714.

The filter circuit 713 and the encoder 714 operate in the same way as described for the third embodiment of the invention and, therefore, repeated description is not necessary.

In the structure of this fifth embodiment, since compensation is performed as described above, even when a great difference exists in image feature data between adjacent blocks, it is avoided that the quality of decoded image greatly differs between adjacent blocks and the difference displeases the viewer.

As described above, according to the fifth embodiment, an input image signal is divided into a plurality of local regions, and the filter characteristic and the quantization characteristic are decided for each local region of the input image signal on the basis of the image feature data of each local region and the frequency distribution over a predetermined period. After performing adaptive filtering, each local region is coded according to quantization characteristic. Since only the image feature data of the image signal before being filtered is used for deciding the filter characteristic and the quantization characteristic, high-speed and simple processing is achieved.

Embodiment 6.

Hereinafter, a sixth embodiment of the present invention corresponding to the ninth and twenty-fourth aspects will be described with reference to FIG. 8.

Figure 8:
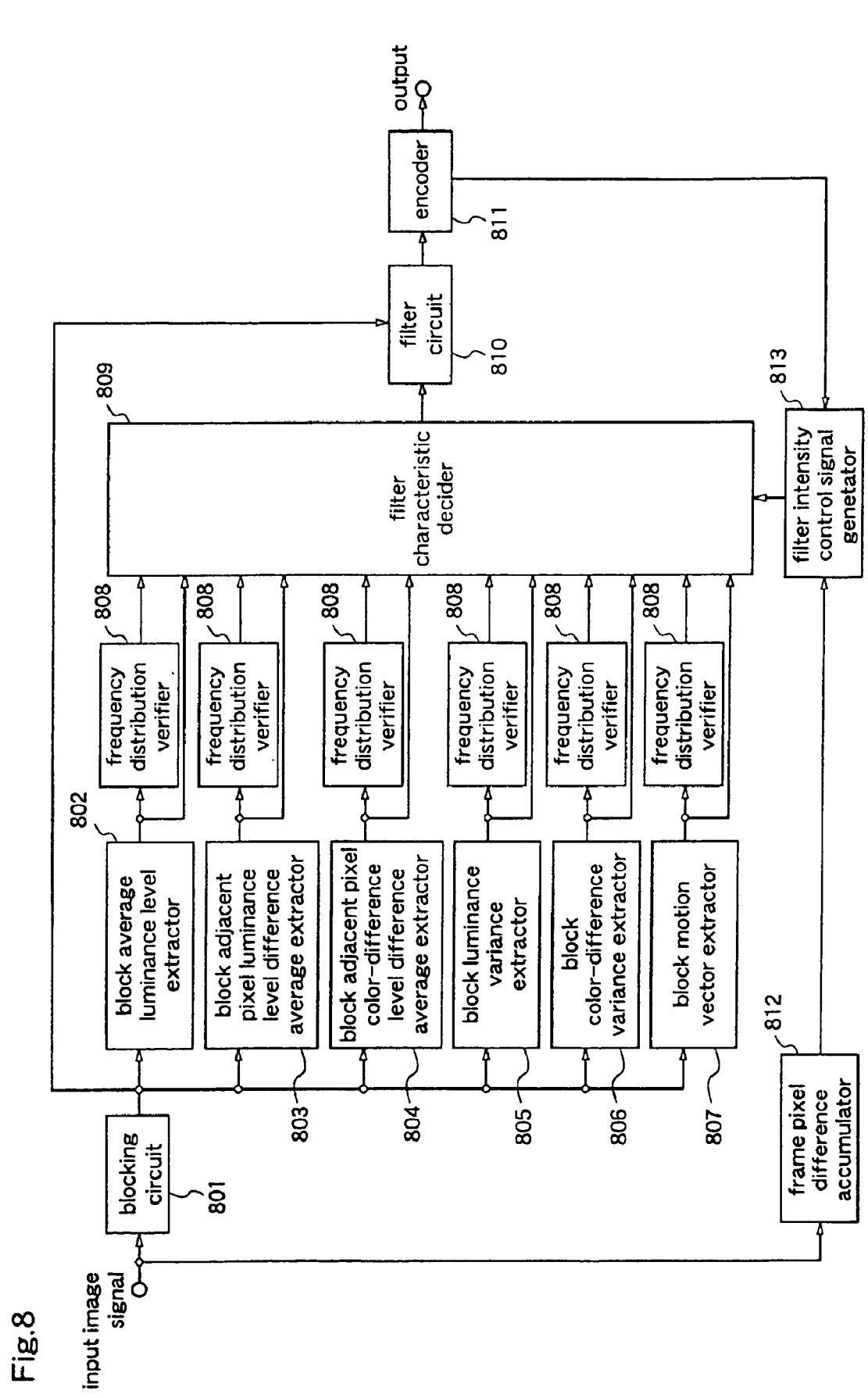
FIG. 8 is a block diagram illustrating an image coding apparatus according to a sixth embodiment of the present invention.

FIG. 8 is a block diagram illustrating an image coding apparatus to which the sixth embodiment of the invention is applied.

As shown in FIG. 8, the image coding apparatus of this eighth embodiment comprises a blocking circuit 801 for dividing an input image signal into a plurality of two-dimensional blocks each comprising a plurality of pixels; a block average luminance level extractor 802 for extracting the average luminance level of each blocked region; a block adjacent pixel luminance level difference average extractor 803 for extracting the average of the absolute difference in luminance levels between adjacent pixels in each blocked region; a block adjacent pixel color-difference level difference average extractor 804 for extracting the average of absolute difference in color-difference levels between adjacent pixels in each blocked region; a block luminance variance extractor 805 for extracting the luminance level variance of each blocked region; a block color-difference variance extractor 806 for extracting the color-difference variance of each blocked region; a block motion vector extractor 807 for extracting a value representing the motion vector of each blocked region; frequency distribution verifiers 808 each for calculating the average and variance from the frequency distribution over a predetermined period, of each characteristic data for each block; a filter characteristic decider 809; a filter circuit 810, an encoder 811, a frame pixel difference accumulator 812, and a filter intensity control signal generator 813.

Next, the operation of the image coding apparatus will be described with reference to FIG. 8.

The image coding apparatus of this sixth embodiment is fundamentally identical to that of the second embodiment except that a signal for controlling the filter intensity from the outside is supplied from the filter intensity control signal generator 813, and the quantity of generated codes is output from the encoder 811 to the filter intensity control signal generator 813. Hereinafter, only the difference between them will be described.

In FIG. 8, initially, an input image signal is input to the blocking circuit 801 to be processed as described for the second embodiment and, on the other hand, it is input to the frame pixel difference accumulator 812.

The frame pixel difference accumulator 812 calculates the absolute value of level difference in the time-axis direction of pixels located in the same spatial position between continuous frames constituting the image signal, and this value is accumulated for a predetermined period, e.g., 15 frames, and the result is output to the filter intensity control signal generator 813. The accumulated sum of the frame pixel difference accumulator 812 is initialized to 0 for every 15 frames.

On the other hand, the encoder 811 encodes the image signal which has been filtered for each block by the filter circuit 810. Further, the encoder 811 calculates the quantity of codes per frame, which are generated by coding each frame, and outputs the result to the filter intensity control signal generator 813.

The filter intensity control signal generator 813 outputs a filter intensity signal for controlling the filter characteristic as a whole, to the filter characteristic decider 809, on the basis of the accumulated value signal which is supplied feed-forward-wise from the input image, and the generated code quantity signal which is supplied feedback-wise from the encoder 811.

For example, when the accumulated value signal from the frame pixel difference accumulator 812 is large, a filter set having narrow frequency band characteristics is selected. When the accumulated value signal is small, a filter set having broad frequency band characteristics is selected.

Further, when the variation in quantity of generated codes per frame supplied from the encoder 811 is small, a filter set having narrow frequency band characteristics is selected. When the variation is large, a filter set having broad frequency band characteristics is selected.

When the encoder 811 is constructed like an inter-frame predictive encoder, the coding efficiency is considerably lowered and the quantity of generated codes is increased for an input image signal which moves greatly.

At this time, since the accumulated value of the absolute value of the frame pixel level difference for the predetermined period becomes relatively large, the filter intensity is increased using this property to limit the frequency band of the input image signal, whereby the original data quantity is limited, resulting in increased coding efficiency. Further, the difference in the quantity of generated codes per frame, which is actually calculated by the encoder 811, is reduced for an input image which moves greatly, but there is a large difference in the quantity of generated codes between the intra-frame coded frame and the inter-frame predictive coded frame. By using this property, the filter intensity is increased when the ratio of the generated code quantity of each frame does not vary very much, resulting in the same effect as mentioned above.

Although the frame pixel difference accumulator 812 performs accumulative addition over a period of 15 frames, when this period is shorter than 15 frames, control of filter intensity is performed at shorter intervals. When this period is longer than 15 frames, control of filter intensity is performed at longer intervals.

Further, the filter intensity may be controlled according to accumulated quantity of generated codes per frame for a predetermined period, with the same effect as described above.

As described above, according to the sixth embodiment, in the image coding method according to any of second to fifth embodiments, the filter characteristic is adaptively decided to the image feature data of each local region and the control signal supplied from the outside, whereby the filter characteristic of the whole image can be externally controlled.

Embodiment 7.

Hereinafter, a seventh embodiment of the present invention corresponding to the fifteenth and thirtieth aspects will be described with reference to FIG. 9.

Figure 9:
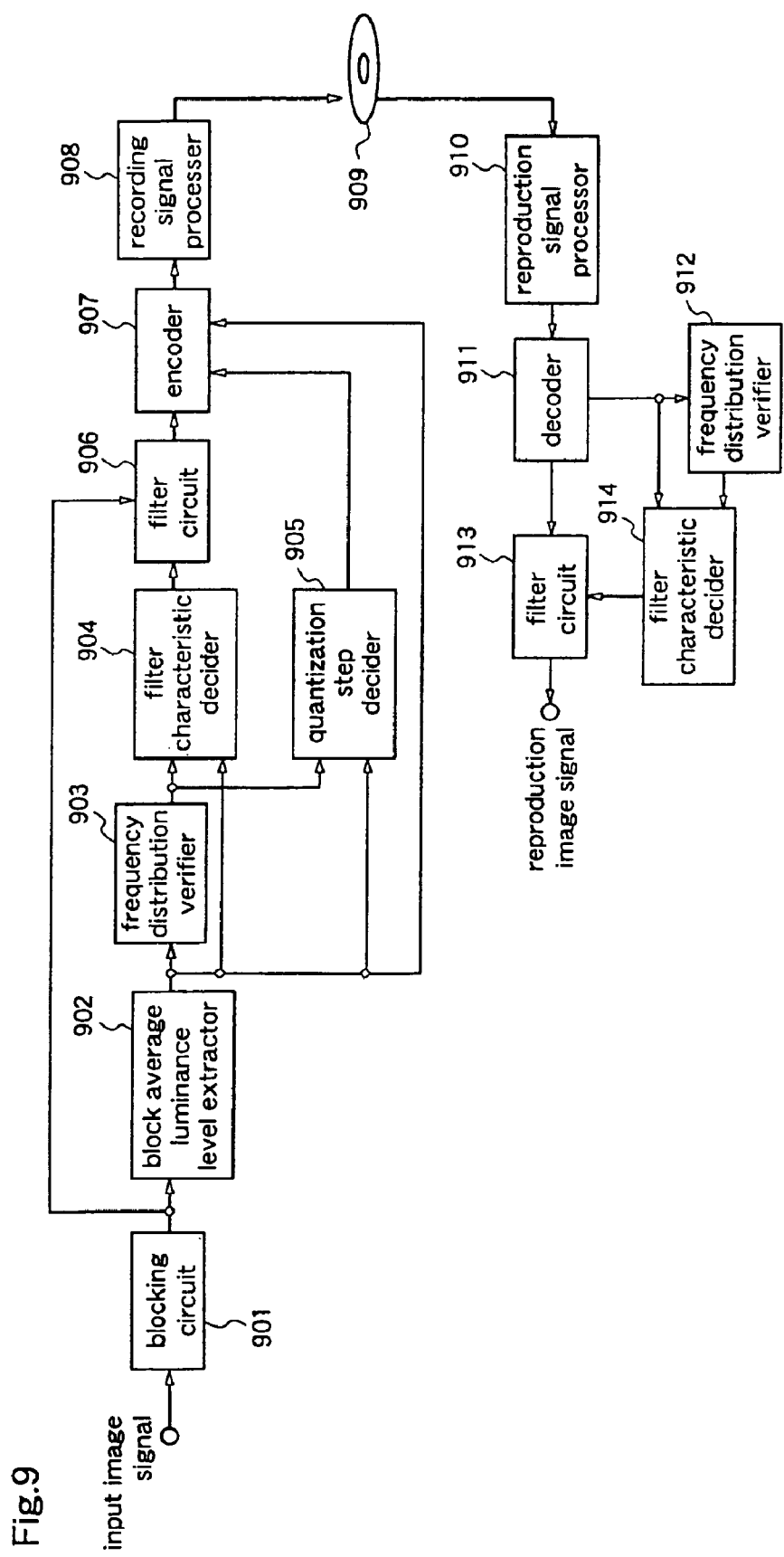
FIG. 9 is a block diagram illustrating an image recording and reproduction apparatus according to a seventh embodiment of the present invention.

FIG. 9 is a block diagram illustrating an image recording/reproduction apparatus to which the seventh embodiment of the invention is applied.

As shown in FIG. 9, the image recording/reproduction apparatus of this seventh embodiment comprises a blocking circuit 901 for dividing an input image signal into a plurality of two dimensional blocks each comprising a plurality of pixels; a block average luminance level extractor 902 for extracting the average luminance level of each blocked region; a frequency distribution verifier 903 for calculating the average and variance from the frequency distribution over a predetermined period, of the average luminance level of each block extracted; a filter characteristic decider 904 for deciding the filter characteristic for each block; a quantization step decider 905; a filter circuit 906 adaptively operating to each block; an encoder 907; a recording signal processor 908; a recording medium 909; a reproduction signal processor 910; a decoder 911 for decoding coded data sequences; a frequency distribution verifier 912 for obtaining the frequency distribution for a predetermined period from the average luminance level of each decoded block, and verifying this; a filter circuit 913 adaptively operating to each block of the decoded image signal; and a filter characteristic decider 914 for deciding the filter characteristic of each block. To simplify the description, only the average luminance level is taken as an example of image feature data.

Next, the operation of the image coding apparatus will be described with reference to FIG. 9.

The process steps of extracting the average luminance level as the image feature data of each block, obtaining the frequency distribution over one frame period, calculating its average $\mu$ and variance $\sigma$, subjecting each block to filtering by adaptively changing the filter characteristic for each block, and outputting the filtered image signal to the encoder 907, and the process steps of deciding the quantization step for each block, and outputting it to the encoder 907, are identical to those described for the first and second embodiments of the invention.

In FIG. 9, the image signal which has been adaptively filtered block by block by the filter circuit 906, is encoded by the encoder 907 according to the quantization step decided for each block. Further, the encoder 907 encodes the average luminance level of each block extracted by the block average luminance level extractor 902, and outputs a coded data sequence to the recording signal processor 908.

The recording signal processor 908 subjects the input coded data sequence to signal processing, such as addition of an error correcting code and address data, formatting, channel coding, and the like, and records the digital data on the recording medium 909.

The reproduction signal processor 910 reproduces the digital data from the recording medium 909, and performs the inverse process of the signal processing performed by the recording signal processor 908 to output a coded data sequence to the decoder 911.

The decoder 911 decodes the coded data sequence, and outputs the average luminance level of each decoded block to the frequency distribution verifier 912 and to the filter characteristic decider 914 and, on the other hand, it outputs the decoded image signal to the filter circuit 913.

The frequency distribution verifier 912 calculates the average and variance of the average luminance level from the frequency distribution of the average luminance level of each input block for a predetermined period, and outputs them to the filter characteristic decider 914.

The filter characteristic decider 914 decides the filter characteristic for each block on the basis of the block average luminance level, and its average and variance over the predetermined period, and outputs this data to the filter circuit 913.

The filter circuit 913 subjects the decoded image signal supplied from the decoder 911 to adaptive filtering based on the data decided by the filter characteristic decider 914 for each block, and outputs a reproduced image signal.

In the construction mentioned above, since the image feature data of each block obtained at the recording end is recorded as a coded data sequence on the recording medium, it is not necessary to extract it at the reproduction end, and filtering adapted to each block can be performed by using these data.

As described above, according to the seventh embodiment, in the coding method according to any of the first through sixth aspects, the image feature data of each local region is encoded as well, and the coded data sequence is recorded. At reproduction, the coded data sequence is decoded, and adaptive filtering is performed for each local region of the decoded image signal on the basis of the decoded image feature data of each local region. Therefore, adaptive filtering can be performed on the decoded image signal without extracting the image feature data of each local region at reproduction, whereby coding noise is effectively reduced, and signal enhancement is achieved.

While in the first to seventh embodiments the input image signal is divided into blocks each comprising 16×16 pixels, the number of pixels in each divided block is not limited thereto. Further, although one frame period is taken as an example of a predetermined period, one field period may be adopted.

Further, although a filter circuit performing frequency band limitation is taken as an example, a timing axis cyclic type noise removal filter or a filter performing compression and decompression in the pixel level direction like gamma compensation, may be used.

Furthermore, degradation of the decoded image quality due to noise can be suppressed by selectively and strongly suppressing the noise in a region which attracts human eyes, before coding, by using a noise removal filter. When using compression and decompression in the level direction of pixels, coding noise generated in the decoded image can be reduced by, for example, reducing the signal gradation of a region which attracts human eyes and then performing coding.

In the aforementioned embodiments, the frequency distribution of each image feature data is verified from the image feature data of each block, and the quantization characteristic and the filter characteristic are decided after calculating the average and variance. However, to simplify the processing, the most popular and fixed distribution data may be used without verifying the frequency distribution.

Further, when performing verification of the frequency distribution, each image feature data for a predetermined period must be stored block by block in a memory.

Further, since the image feature data as a whole does not change greatly within the same scene, the memory capacity can be reduced by storing, in a memory, only the average and variance of each image feature data a predetermined period before, and deciding the quantization characteristic and the filter characteristic by using these data and the image feature data of each block to be coded.

Embodiment 8.

Figure 10:
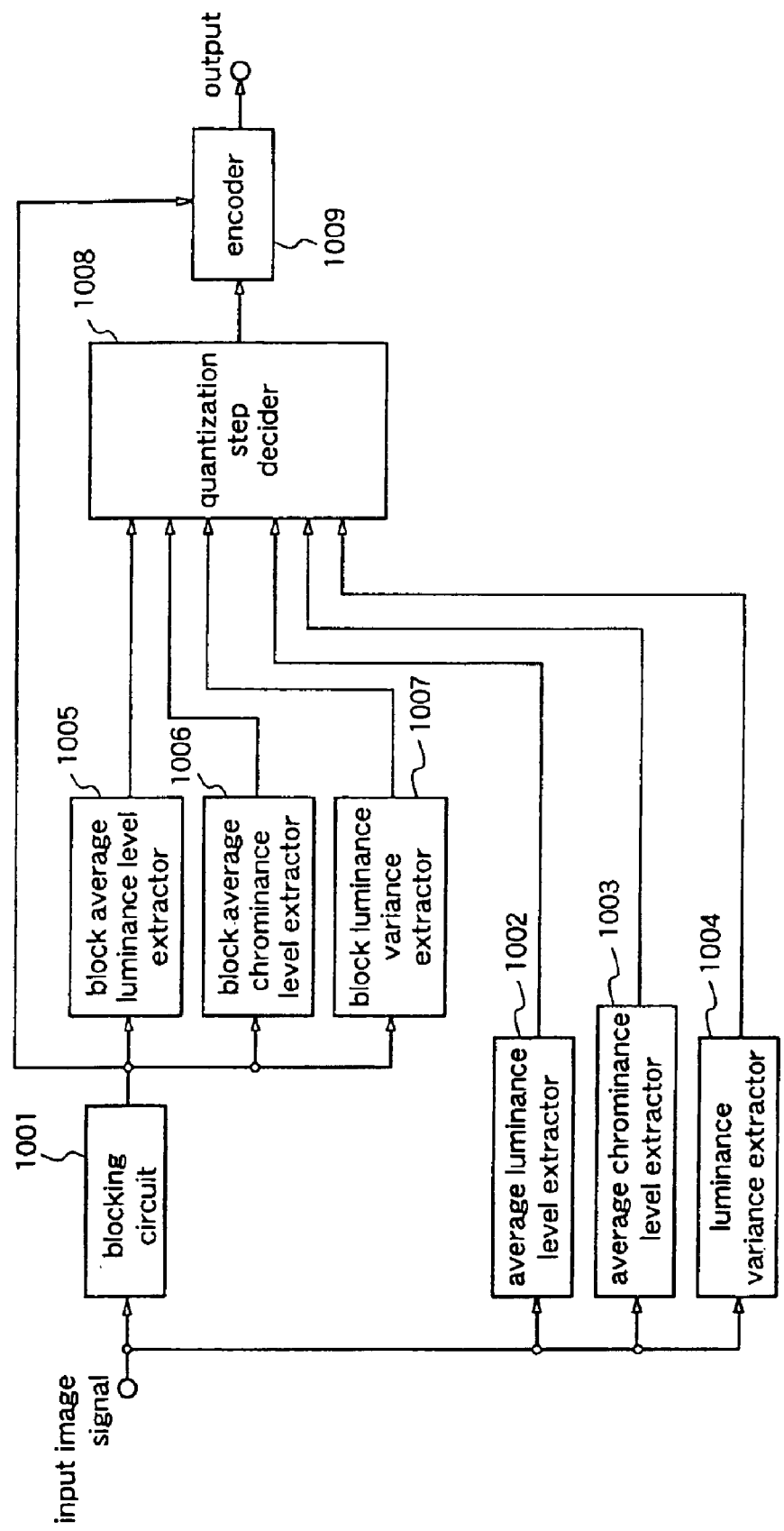
FIG. 10 is a block diagram illustrating an image coding apparatus according to an eighth embodiment of the present invention.

FIG. 10 shows an image coding apparatus to which an eighth embodiment of the present invention is applied. The image coding apparatus comprises a blocking circuit 1001 for dividing an input image signal into a plurality of two-dimensional blocks each comprising a plurality of pixels; an average luminance level extractor 1002 for extracting the average luminance level over a predetermined period from the input image signal; an average chrominance level extractor 1003 for extracting the average chrominance level over the predetermined period from the input image signal; a luminance variance extractor 1004 for extracting the luminance variance over the predetermined period from the input image signal; a block average luminance level extractor 1005 for extracting the average luminance level of each blocked region; a block average chrominance level extractor 1006 for extracting the average chrominance level of each blocked region; a block luminance variance extractor 1007 for extracting the luminance variance of each blocked region; a quantization step decider 1008; and an encoder 1009.

The operation of the image coding apparatus will be described with reference to FIG. 10.

An input image signal is divided into sub-blocks each comprising, for example, 16×16 pixels by the blocking circuit 1001. On the other hand, the average luminance level, the average chrominance level, and the luminance variance are extracted from the image signal for a period of one frame of the image signal by the average luminance level extractor 1002, the average chrominance level extractor 1003, and the luminance variance extractor 1004, respectively. The image signal blocked by the blocking circuit 1001 is input to the block average luminance level extractor 1005, the block average chrominance level extractor 1006, the block luminance variance extractor 1007, and the encoder 1009. The average luminance level, the average chrominance level, and the luminance variance are extracted for each divided block, in the block average luminance level extractor 1005, the block average chrominance level extractor 1006, and the block luminance variance extractor 1007, respectively.

The six kinds of image feature data thus extracted are input to the quantization step decider 1008. The quantization step decider 1008 decides a quantization step for each block on the basis of the six kinds of image feature data, and outputs the data to the encoder 1009. The encoder 1009 encodes the blocked image signal according to the quantization step decided by the quantization step decider 1008, and outputs it.

The specific operation of the quantization step decider 1008 will be described in due order.

Figure 21:
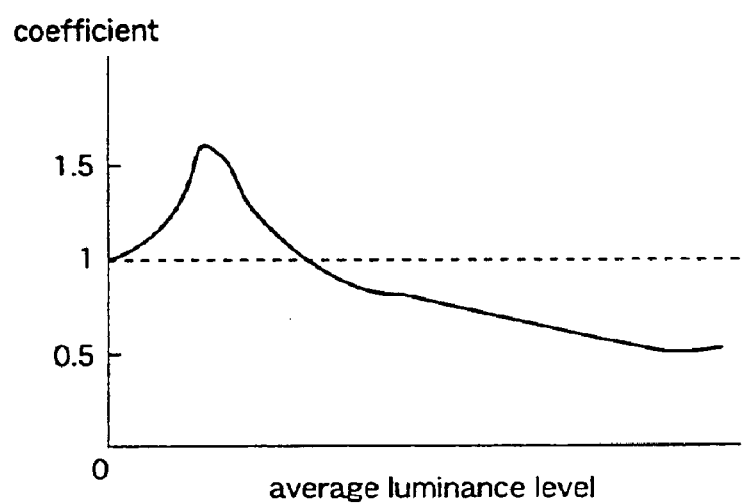
FIG. 21 is a characteristic diagram illustrating the quantization characteristic and the filter characteristic with respect to the average luminance level.
Figure 22:
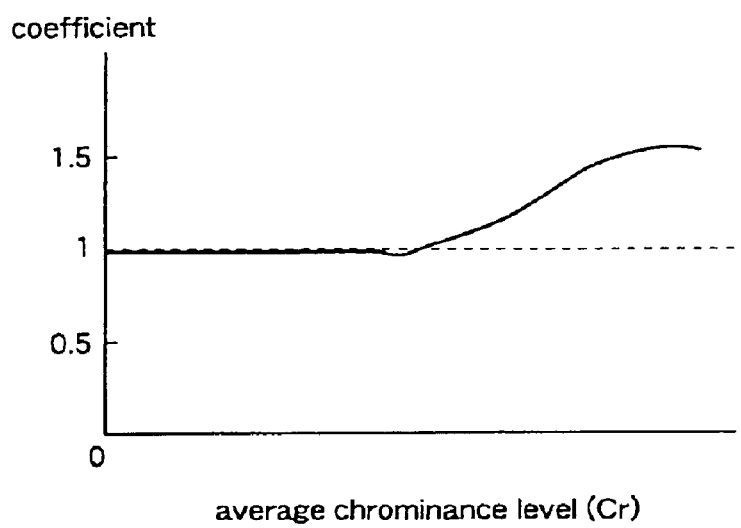
FIG. 22 is a characteristic diagram illustrating the quantization characteristic and the filter characteristic with respect to the average chrominance level.
Figure 23:
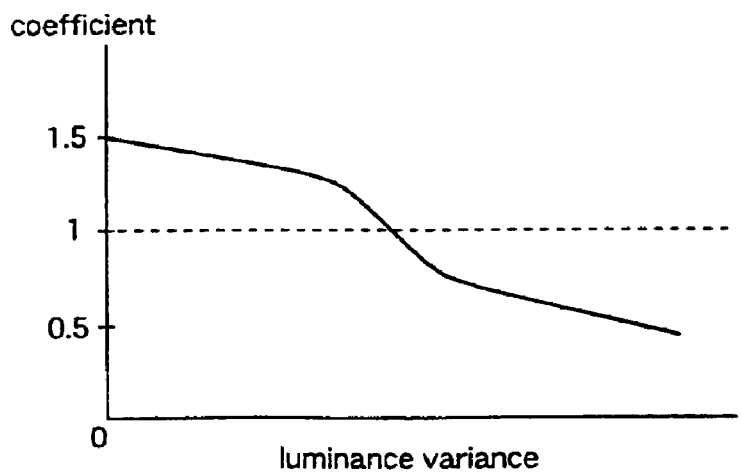
FIG. 23 is a characteristic diagram illustrating the quantization characteristic and the filter characteristic with respect to the luminance variance.

Initially, based on the average luminance level, the average chrominance level, and the luminance variance which are extracted for one frame period of the image signal, a quantization characteristic is decided for the whole image signal of one frame period by using the characteristics shown in FIGS. 21 to 23.

In FIGS. 21 to 23, the abscissa shows the size of each image feature data, and the ordinate shows the coefficient of quantization characteristic. The larger the coefficient is, the smaller the quantization step becomes. That is, the number of bits to be given is increased, and the coding rate is increased.

FIG. 21 shows the characteristics such that the coefficient is 1 when the average luminance level is the level of black, and it reaches a peak at a level where human eyes are most sensitive to degradation. As the average luminance level grows higher than that level, the coefficient gradually approaches 0.5.

FIG. 22 shows the characteristics relating to the red signal (Cr) to which human eyes are sensitive, between two color-difference signals indicating the colors of pixels as the image feature data. The coefficient becomes 1 when the average chrominance level of the red signal (Cr) is 0, and it gradually approaches 1.5 as the level increases.

FIG. 23 shows the characteristics such that the coefficient is large for an image having a small variance of luminance signal, and the coefficient is small for an image having a large variance. The quantization characteristic is thus decided for the whole image signal in one frame period.

Next, the average luminance level, the average chrominance level, and the luminance variance which are extracted for one frame period are extracted from the average luminance level, the average chrominance level, and the luminance variance which are extracted for each divided block, thereby obtaining difference signals. The quantization characteristic decided for the whole image signal is compensated for each block on the basis of these difference signals.

Figure 11:
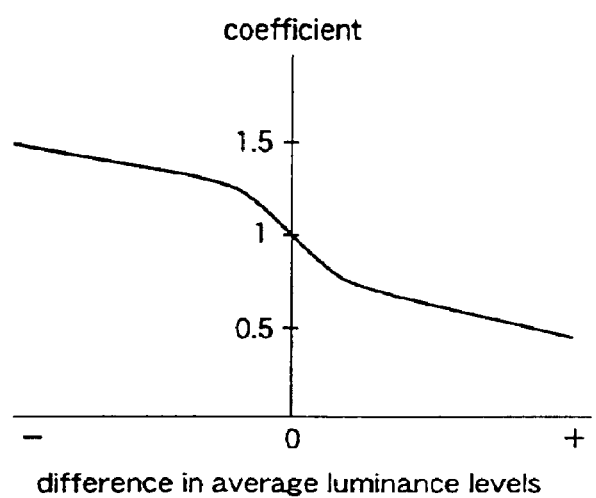
FIG. 11 is a characteristic diagram illustrating the quantization characteristic and the filter characteristic with respect to a difference in average luminance levels according to the eighth embodiment of the invention.
Figure 12:
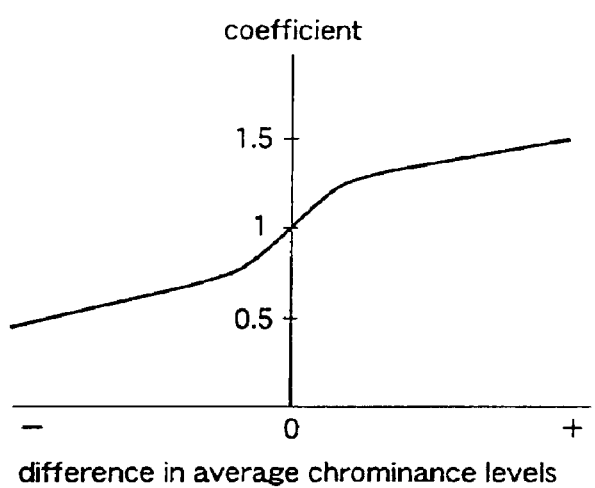
FIG. 12 is a characteristic diagram illustrating the quantization characteristic and the filter characteristic with respect to a difference in average chrominance levels according to the eighth embodiment of the invention.
Figure 13:
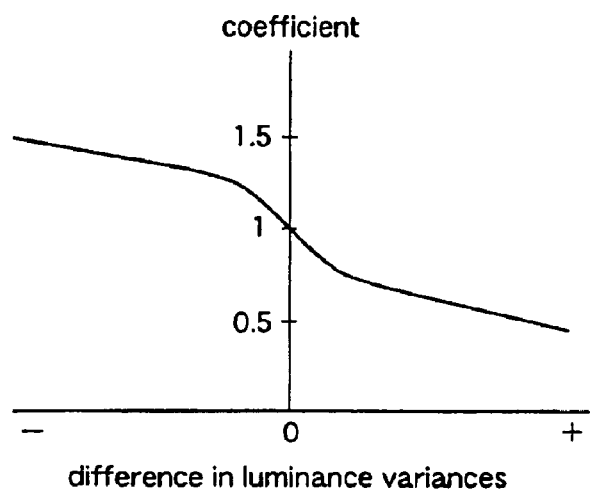
FIG. 13 is a characteristic diagram illustrating the quantization characteristic and the filter characteristic with respect to a difference in luminance variances according to the eighth embodiment of the invention.

Each of FIGS. 11 to 13 shows the relationship between the difference signal of each image feature data and the coefficient of quantization characteristic. A description will be now given of how the quantization characteristic is compensated for each block with respect to each image feature data, with reference to FIGS. 11 to 13.

With respect to the average luminance level, the coefficient becomes 1 when the difference value is 0 as shown in FIG. 11. As the average luminance level increases in the positive direction (i.e., as the block average luminance level grows higher than the whole average luminance level), the coefficient gradually approaches 0.5. Inversely, as the average luminance level increases in the negative direction (i.e., as the block average luminance level grows lower than the whole average luminance level), the coefficient gradually approaches 1.5. By multiplying this coefficient and the coefficient which is decided for the whole image signal for one frame period, the quantization characteristic of each block is decided.

Next, with respect to the average chrominance level, the coefficient is 1 when the difference value is 0 as shown in FIG. 12. As the average chrominance level increases in the positive direction (i.e., as the block average chrominance level grows larger than the whole average chrominance level), the coefficient gradually approaches 1.5. Inversely, as the average chrominance level increases in the negative direction, i.e., as the block average chrominance level grows lower than the whole average chrominance level, the coefficient gradually approaches 0.5. By multiplying this coefficient and the coefficient decided for the whole image signal for one frame period, the quantization characteristic of each block is decided.

Likewise, with respect to the luminance variance, the coefficient is 1 when the difference value is 0 as shown in FIG. 13. As the luminance variance increases in the positive direction, i.e., as the block luminance variance grows larger than the whole luminance variance, the coefficient gradually approaches 0.5. Inversely, as the luminance variance increases in the negative direction, i.e., as the block luminance variance grows smaller than the whole luminance variance, the coefficient gradually approaches 1.5. By multiplying this coefficient and the coefficient decided for the whole image signal for one frame period, the quantization characteristic of each block is decided.

As described above, according to the eighth embodiment, there is provided an image coding method in which the local quantization characteristic of the input image signal is decided on the basis of the image feature data for a predetermined period of the input image signal and the local image feature data of the input image signal, followed by coding. Therefore, precise control of coding rate is achieved.

Embodiment 9.

Figure 14:
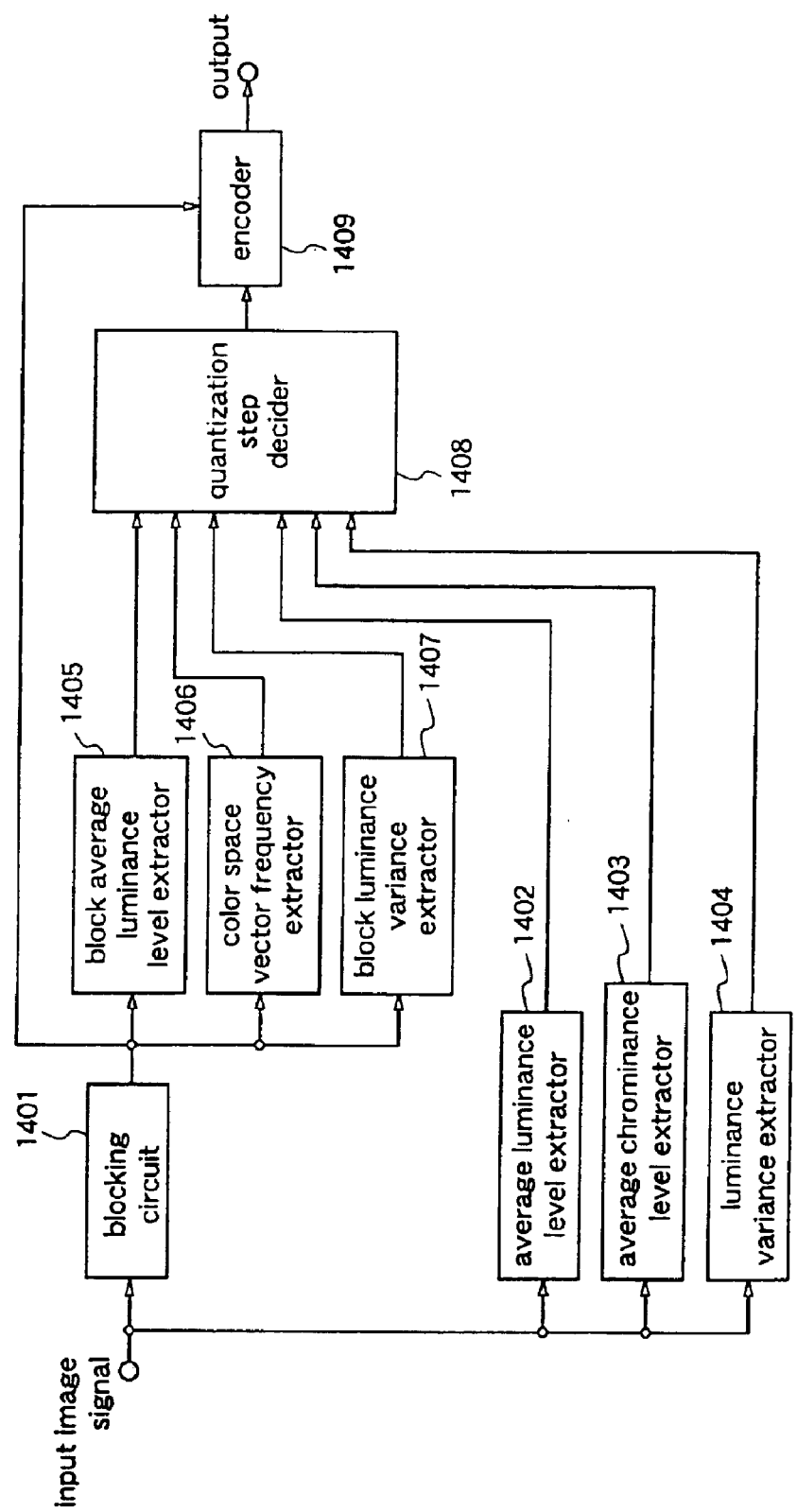
FIG. 14 is a block diagram illustrating an image coding apparatus according to a ninth embodiment of the present invention.

FIG. 14 shows an image coding apparatus to which a ninth embodiment of the invention is applied. The image coding apparatus comprises a blocking circuit 1401 for dividing an input image signal into a plurality of two-dimensional blocks each comprising a plurality of pixels; an average luminance level extractor 1402 for extracting the average luminance level over a predetermined period from the input image signal; an average chrominance level extractor 1403 for extracting the average chrominance level over the predetermined period from the input image signal; a luminance variance extractor 1404 for extracting the luminance variance over the predetermined period from the input image signal; a block average luminance level extractor 1405 for extracting the average luminance level of each blocked region; a color space vector frequency extractor 1406 for calculating a color space vector for each pixel included in each blocked region from the luminance signal and two color-difference signals, deciding whether this vector belongs to a predetermined region in the color space, and extracting the frequency of pixels which belong to the predetermined region; a block luminance variance extractor 1407 for extracting the luminance variance of each blocked region; a quantization step decider 1408, and an encoder 1409. The constituents other than the color space vector frequency extractor 1406 are identical to those shown in FIG. 10.

The operation of the image coding apparatus will be described with reference to FIG. 14.

An input image signal is divided into sub-blocks each comprising, for example, 16×16 pixels, by the blocking circuit 1401. On the other hand, the average luminance level, the average chrominance level, and the luminance variance are extracted from the image signal for one frame period of the image signal by the average luminance level extractor 1402, the average chrominance level extractor 1403, and the luminance variance extractor 1404, respectively. The image signal blocked by the blocking circuit 1401 is input to the block average luminance level extractor 1405, the color space vector frequency extractor 1406, the block luminance variance extractor 1407, and the encoder 1409. The average luminance level and the luminance variance are extracted for each divided block, by the block average luminance level extractor 1405 and the block luminance variance extractor 1407, respectively, in the same manner as described for the eighth embodiment. In the color space vector frequency extractor 1406, the color space vector is calculated for each pixel included in each blocked region from the luminance signal and two color-difference signals, and it is decided whether this vector belongs to a predetermined region in the color space, for example, a region representing a component near the skin color, and the frequency of pixels belonging to this region is extracted.

Figure 15:
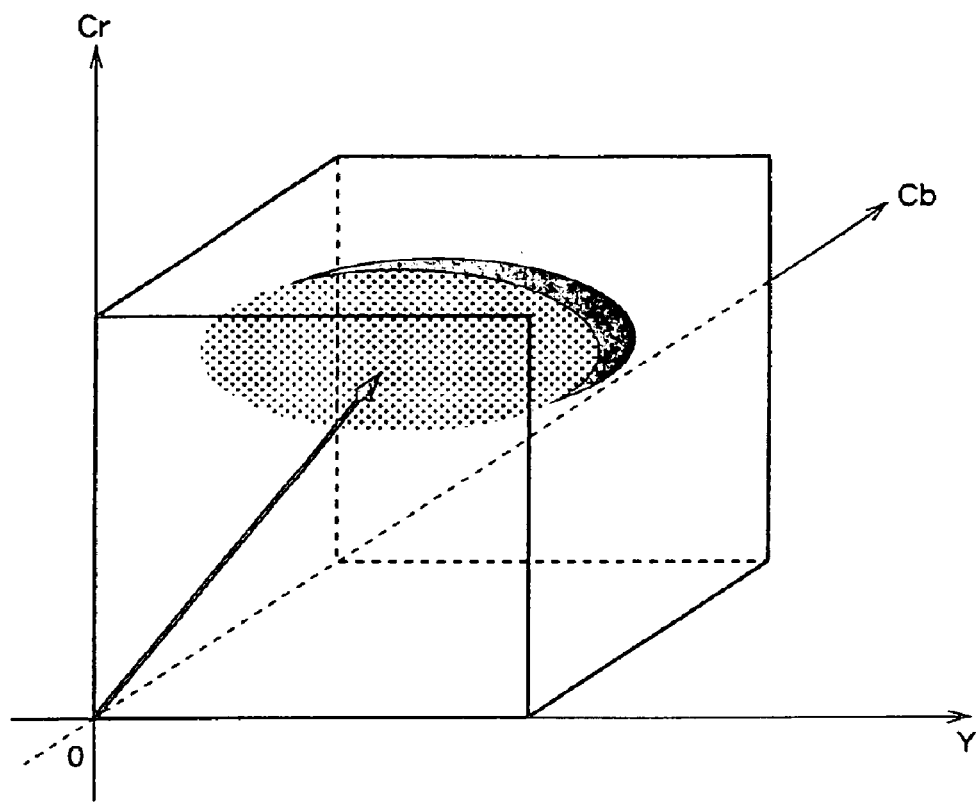
FIG. 15 is a characteristic diagram illustrating a color space vector of a pixel in a color space region, and a skin color region, according to the ninth embodiment of the invention.

FIG. 15 shows a space constituted by the luminance signal (Y) and the two color-difference signals (Cb,Cr), and the arrow shows the color space vector of a pixel. In FIG. 15, the hatched region shows the skin color, and the frequency is calculated when the color space vector belongs to this region. When the color space vectors of all pixels included in the block belong to the skin color region, the frequency becomes 256. When none of the color space vectors belong to the region, the frequency becomes 0.

The six kinds of image feature data extracted in this way are input to the quantization step decider 1408. The quantization step decider 1408 decides the quantization step for each block on the basis of the six kinds of image feature data, and outputs it to the encoder 1409. The encoder 1409 encodes the blocked image signal according to the quantization step decided by the quantization step decider 1408, and outputs the encoded signal.

The specific operation of the quantization step decider 1408 is fundamentally identical to that described for the eighth embodiment and, therefore, only the difference will be described hereinafter. The difference resides in that the quantization characteristic decided for the whole image signal is compensated for each block on the basis of the frequency at which the color space vector extracted for each divided block belongs to the skin color region, which frequency is extracted for each divided block.

Figure 16:
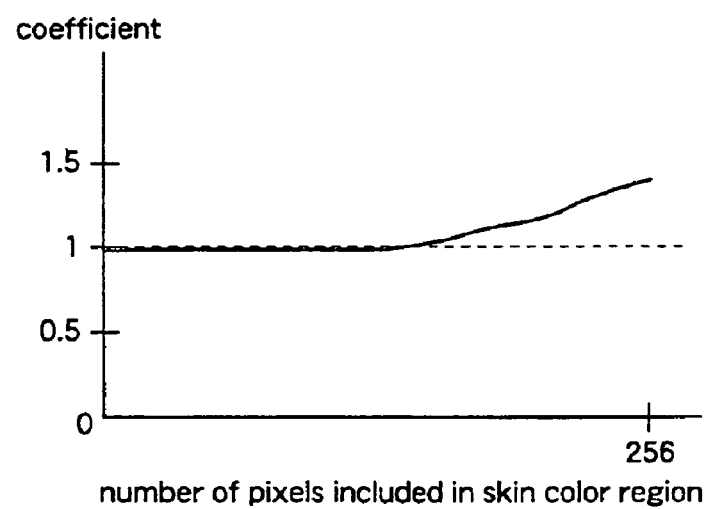
FIG. 16 is a characteristic diagram illustrating the quantization characteristic and the filter characteristic with respect to the frequency at which pixels belong to the skin color region.

FIG. 16 shows an example of the relationship between the extracted frequency and the coefficient of the quantization characteristic. As shown in FIG. 16, the coefficient is 1 when the frequency is 0. The coefficient gradually approaches 1.5 with the increasing frequency. By multiplying this coefficient and the coefficient decided for the whole image signal for one frame period, the quantization characteristic for each block is decided.

As described above, according to the ninth embodiment, since the color space vector frequency is used as the local image feature data instead of the block average chrominance level in the eighth embodiment, the region where the coding noise is conspicuous can be locally reduced utilizing the human visual characteristics to each data, while minimizing the influence on the coding rate.

Embodiment 10.

Figure 17:
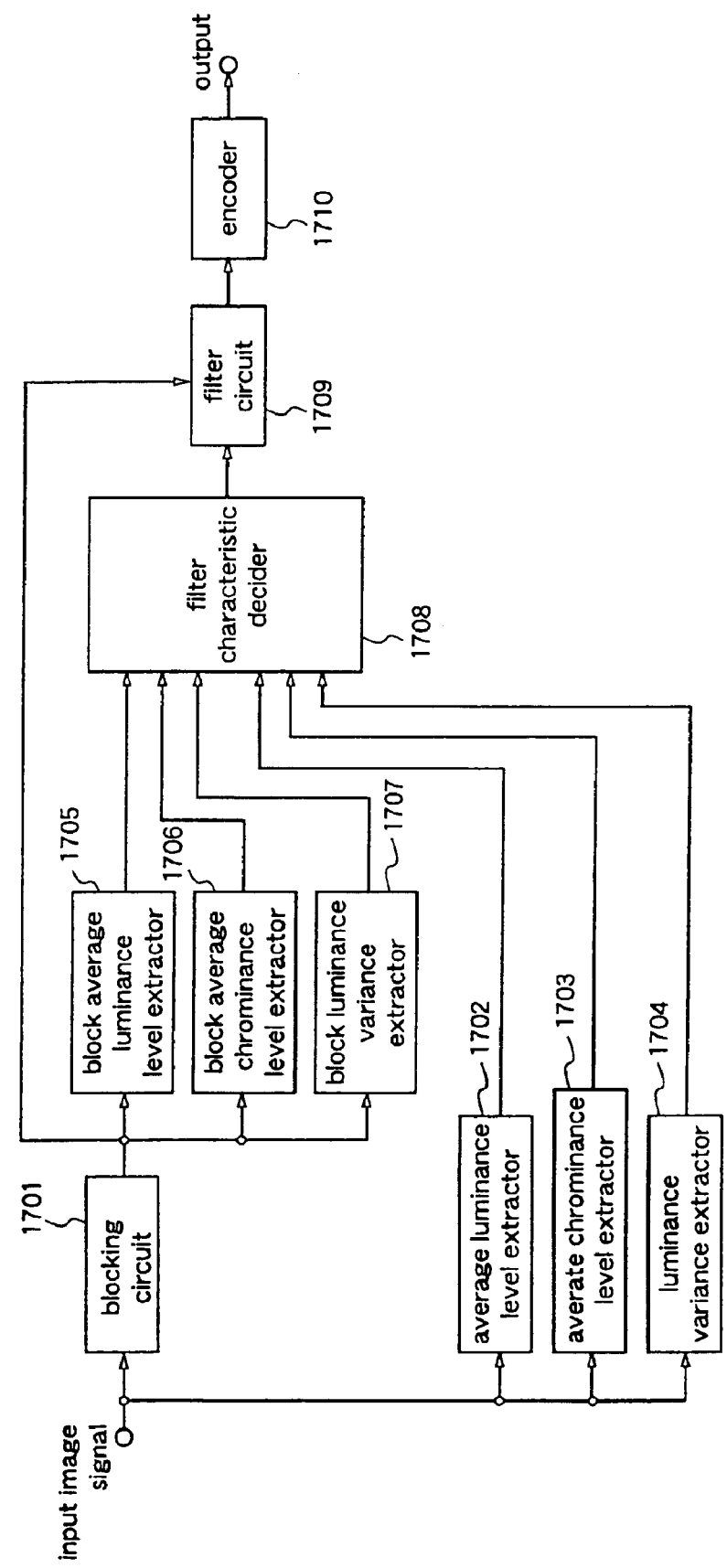
FIG. 17 is a block diagram illustrating an image coding apparatus according to a tenth embodiment of the present invention.

FIG. 17 is a block diagram of an image coding apparatus to which a tenth embodiment of the present invention is applied. The image coding apparatus comprises a blocking circuit 1701 for dividing an input image signal into a plurality of two-dimensional blocks each comprising a plurality of pixels; an average luminance level extractor 1702 for extracting the average luminance level over a predetermined period from the input image signal; an average chrominance level extractor 1703 for extracting the average chrominance level over the predetermined period from the input image signal; a luminance variance extractor 1704 for extracting the luminance variance over the predetermined period from the input image signal; a block average luminance level extractor 1705 for extracting the average luminance level of each blocked region; a block average chrominance level extractor 1706 for extracting the average chrominance level of each blocked region; a block luminance variance extractor 1707 for extracting the luminance variance of each blocked region; a filter characteristic decider 1708; a filter circuit 1709; and an encoder 1710.

The operation of the image coding apparatus will be described in detail with reference to FIG. 17. Since the operation up to extracting the six kinds of image feature data is identical to that described for the eighth embodiment and, therefore, does not require repeated description.

The extracted six kinds of image feature data are input to the filter characteristic decider 1708. The filter characteristic decider 1708 decides the filter characteristic for each block on the basis of the six kinds of image feature data, and outputs it to the filter circuit 1709. The filter circuit 1709 performs filtering by adaptively changing the filter characteristic for each block, according to the filter characteristic decided by the filter characteristic decider 1708, and outputs the filtered image signal to the encoder 1710. The encoder 1710 encodes the filtered image signal, and outputs it.

The specific operation of the filter characteristic decider 1708 will be described in due order. To simplify the description, FIGS. 11 to 13 and 21 to 23, which are used to explain the quantization characteristic in the eighth embodiment, are used to explain the filter characteristic.

Figure 18:
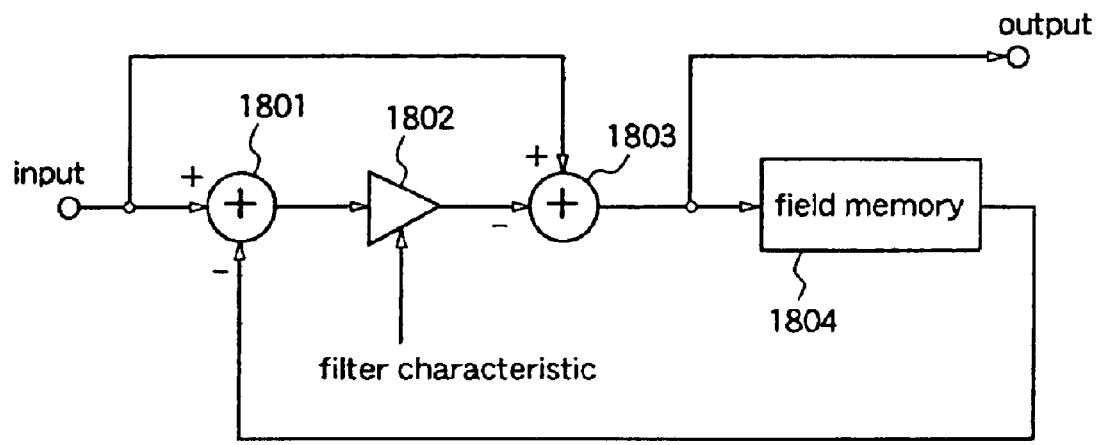
FIG. 18 is a block diagram illustrating an example of a filter circuit according to the tenth embodiment of the invention.

As an example of a filter, a time axis cyclic type noise removal filter which is generally known is adopted. FIG. 18 is a block diagram of this filter.

The filter shown in FIG. 18 comprises subtracters 1801 and 1803, a multiplier 1802, and a field memory 1804. A difference between the input image signal and the filtered signal of one field before is calculated by the subtracter 1801. A value calculated by the multiplier 1802 according to the result of subtraction and the filter characteristic supplied from the outside is subtracted from the input image signal by the subtracter 1803 and, on the other hand, the calculated value is stored in the field memory for one field period to be used for the next field processing.

Initially, the filter characteristic is decided for the whole image signal in one frame period according to the characteristics shown in FIGS. 21 to 23, on the basis of the average luminance level, the average chrominance level, and the luminance variance which are extracted for one frame period of the image signal.

In FIGS. 21 to 23, the abscissa shows the size of each image feature data, and the ordinate shows the coefficient of filter characteristic. The larger the coefficient is, the stronger the filtering to be performed is. That is, the coefficient of the multiplier 1802 shown in FIG. 18 increases, and the quantity of removed noise increases.

FIG. 21 shows the characteristics such that the coefficient becomes 1 when the average luminance level is the level of black, and it reaches a peak at a level where human eyes are most sensitive to degradation, and gradually approaches 0.5 as the level grows higher.

FIG. 22 shows the characteristics relating to the red signal to which human eyes are sensitive, between the two color-difference signals indicating the colors of pixels as image feature data. The coefficient is 1 when the average chrominance level of the red signal is 0, and it gradually approaches 1.5 as the level increases.

FIG. 23 shows the characteristics such that the coefficient is large for an image having a small variance of the luminance signal, and the coefficient is small for an image having a large variance. In this way, the filter characteristic is decided for the whole image signal in one frame period. Next, the average luminance level, the average chrominance level, and the luminance variance which are extracted for one frame period are subtracted from the average luminance level, the average chrominance level, and the luminance variance which are extracted for each divided block, respectively, thereby obtaining difference signals. Based on these difference signals, the filter characteristic decided for the whole image signal is compensated for each block.

Each of FIGS. 11 to 13 shows the relationship between the difference signal of each image feature data and the coefficient of filter characteristic. A description will be given of how to compensate the filter characteristic for each block with respect to each image feature data, with reference to FIGS. 11 to 13.

With respect to the average luminance level, the coefficient is 1 when the difference value is 0 as shown in FIG. 11. As the average luminance level increases in the positive direction, i.e., as the block average luminance level grows higher than the whole average luminance level, the coefficient gradually approaches 0.5. Inversely, as the average luminance level increases in the negative direction, i.e., as the block average luminance level grows lower than the whole average luminance level, the coefficient gradually approaches 1.5. By multiplying this coefficient and the coefficient which is decided for the whole image signal in one frame period, the filter characteristic of each block is decided.

Next, with respect to the average chrominance level, the coefficient is 1 when the difference value is 0 as shown in FIG. 12. As the average chrominance level increases in the positive direction, i.e., as the block average chrominance level grows larger than the whole average chrominance level, the coefficient gradually approaches 1.5. Inversely, as the average chrominance level increases in the negative direction, i.e., as the block average chrominance level grows lower than the whole average chrominance level, the coefficient gradually approaches 0.5. By multiplying this coefficient and the coefficient decided for the whole image signal in one frame period, the filter characteristic of each block is decided.

Likewise, with respect to the luminance variance, the coefficient is 1 when the difference value is 0 as shown in FIG. 13. As the luminance variance increases in the positive direction, i.e., as the block luminance variance grows larger than the whole luminance variance, the coefficient gradually approaches 0.5. Inversely, as the luminance variance increases in the negative direction, i.e., as the block luminance variance grows smaller than the whole luminance variance, the coefficient gradually approaches 1.5. By multiplying this coefficient and the coefficient decided for the whole image signal in one frame period, the filter characteristic of each block is decided.

These filter characteristics are input to the multiplier 1802 shown in FIG. 18. The maximum value of the coefficient to be multiplied is normalized at 1.

As described above, according to the tenth embodiment, the local filter characteristic of the input image signal is decided on the basis of the image feature data of the input image signal for a predetermined period and the local image feature data of the input image signal, followed by adaptive filtering, and coding. Therefore, by locally reducing the noise component or controlling the frequency band before coding by adaptive filtering, generation of coding noise and increase in coding rate are suppressed.

Embodiment 11.

Figure 19:
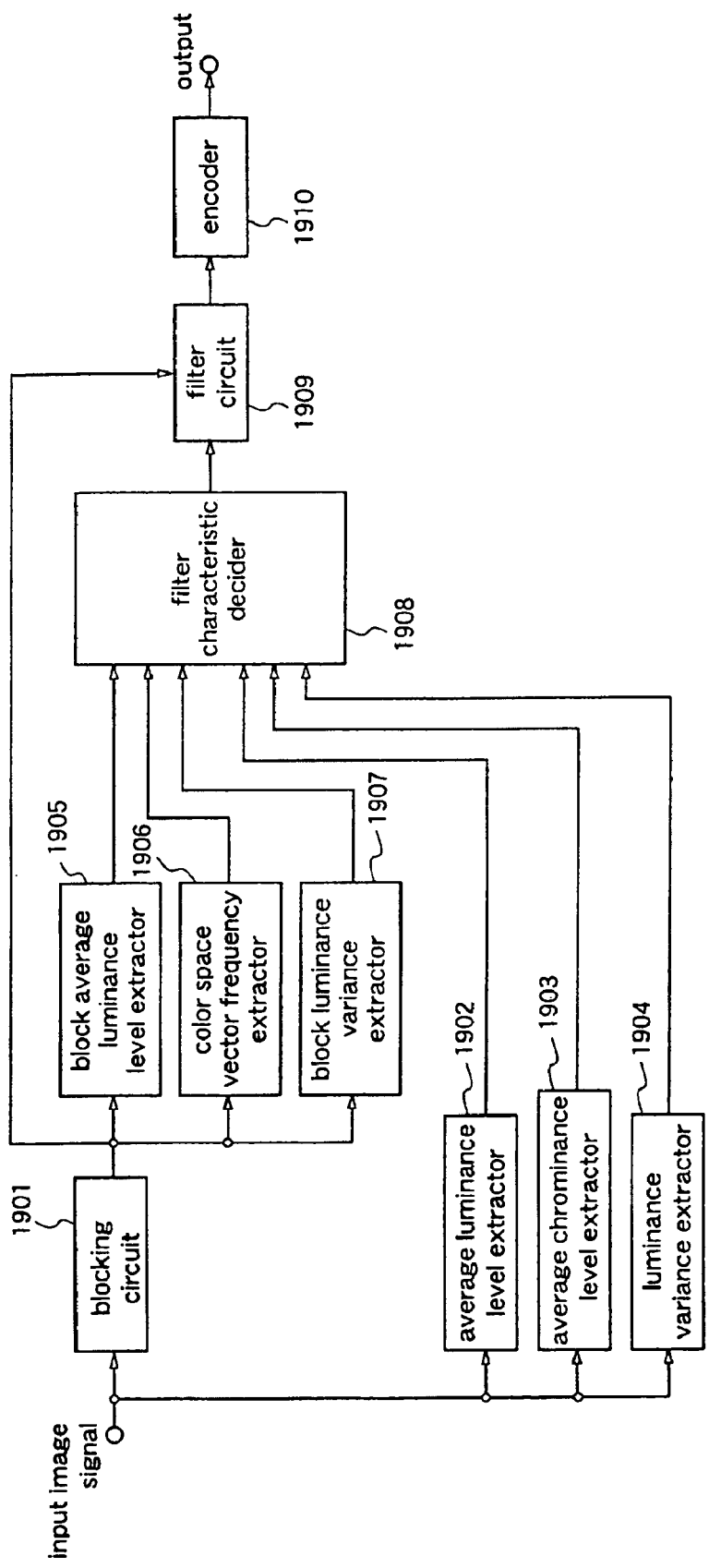
FIG. 19 is a block diagram illustrating an image coding apparatus according to an eleventh embodiment of the present invention.
Figure 20:
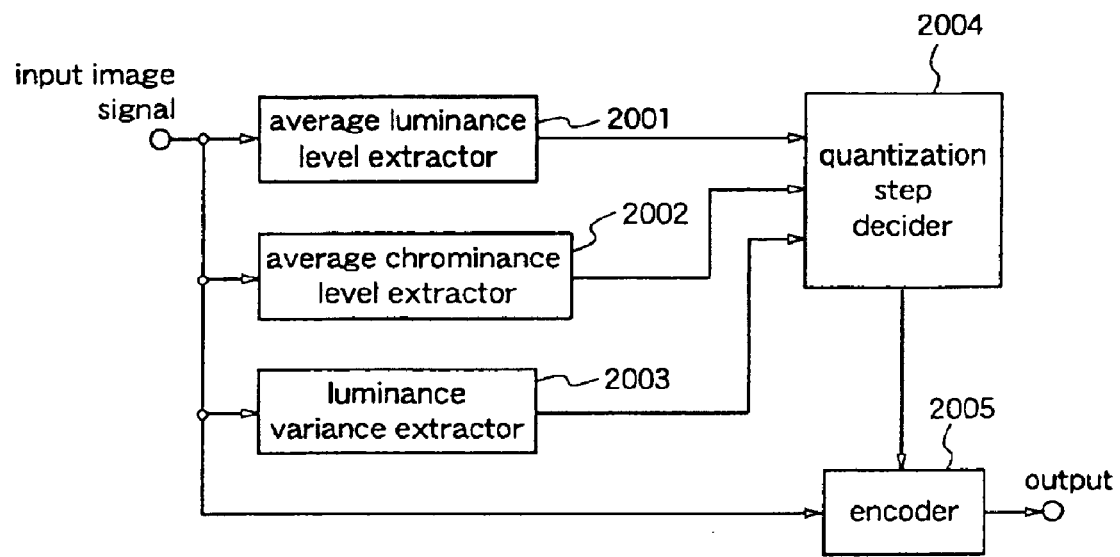
FIG. 20 is a block diagram illustrating the conventional image coding apparatus.

FIG. 19 shows an image coding apparatus to which an eleventh embodiment of the present invention is applied. The image coding apparatus comprises a blocking circuit 1901 for dividing an input image signal into a plurality of two-dimensional blocks each comprising a plurality of pixels; an average luminance level extractor 1902 for extracting the average luminance level over a predetermined period from the input image signal; an average chrominance level extractor 1903 for extracting the average chrominance level over the predetermined period from the input image signal; a luminance variance extractor 1904 for extracting the luminance variance over the predetermined period from the input image signal; a block average luminance level extractor 1905 for extracting the average luminance level of each blocked region; a color space vector frequency extractor 1906 for calculating a color space vector for each pixel included in each blocked region from the luminance signal and the two color-difference signals, deciding whether or not this vector belongs to a predetermined region in the color space, and extracting the frequency of pixel which belongs to this region; a block luminance variance extractor 1907 for extracting the luminance variance of each blocked region; a filter characteristic decider 1908; a filter circuit 1909; and an encoder 1910. The constituents other than the color space vector frequency extractor 1906 are identical to those described with respect to FIG. 17.

The operation of the image coding apparatus will be described with reference to FIG. 19. The operation up to extracting the six kinds of image feature data is identical to that described for the ninth embodiment and, therefore, does not require repeated description.

The extracted six kinds of image feature data are input to the filter characteristic decider 1908. The filter characteristic decider 1908 decides the filter characteristic for each block on the basis of the six kinds of image feature data, and outputs it to the filter circuit 1909. The filter circuit 1909 performs filtering by adaptively changing the filter characteristic for each block, according to the filter characteristic decided by the filter characteristic decider 1908, and outputs the filtered image signal to the encoder 1910. The encoder 1910 encodes the filtered image signal and outputs it.

The specific operation of the filter characteristic decider 1908 is fundamentally identical to that described for the tenth embodiment and, therefore, only the difference will be described hereinafter.

The difference resides in that the filter characteristic decided for the whole image signal is compensated for each block on the basis of the frequency at which the extracted color space vector belongs to the skin color region. To simplify the description, FIG. 16, which is explained as a diagram showing the quantization characteristic in the second embodiment of the invention, will be used as a diagram showing the filter characteristic.

FIG. 16 shows examples of extracted frequency and filter characteristic. The coefficient is 1 when the frequency is 0 as shown in FIG. 16, and the coefficient gradually approaches 1.5 as the frequency is increased. By multiplying this coefficient and the coefficient decided for the whole image signal in one frame period, the filter characteristic of each block is decided.

While in the eighth to eleventh embodiments the input image signal is divided into blocks each comprising 16×16 pixels, the number of pixels in each divided block is not limited thereto. Further, although one frame period is taken as an example of a predetermined time, one field period may be adopted.

Further, the representative vector data in the color space is described using the frequency data at which the color space vector, which is represented by the average data of the two color-difference signals possessed by each pixel and the luminance signal and the two color-difference signals possessed by each pixel, belongs to a predetermined region, especially, the skin color region. However, the frequency data compensated by the average data according to, for example, the degree of the skin color in each block, may be used. Thereby, precise control adapted to the human visual characteristics can be achieved.

While in the tenth and eleventh embodiments of the present invention, a timing axis cyclic type noise removal filter is taken as an example of a filter circuit, a horizontal filter or a space filter which limits the frequency band may be used. Alternatively, a filter performing compression and decompression in the level direction of pixels, such as gamma compensation, may be used.

When the frequency band of the input image signal is limited by a filter, the filter characteristics corresponding to the image feature data shown in FIGS. 11 to 13 and 16 must be changed. Hereinafter, this will be described briefly. A difference between each image feature data extracted for a predetermined period and each image feature data in each local region is calculated, and the filter characteristic is eased as the absolute value of the difference is increased. That is, a region where the image feature data in the local region becomes larger than the average image feature data for one frame period is not subjected to frequency band limitation, or a region detected as a skin color region is not subjected to frequency band limitation. Thereby, the frequency band in a region other than the singular region in the image in one frame period is limited, whereby the frequency band of a region which attracts human eyes is stored while reducing generation of coding rate as a whole.

Further, when deciding whether the filter characteristic is to be eased or not, this decision may be made to only an image having a relatively small variance, by using the absolute value of a difference between each image feature data extracted for a predetermined period and each image feature data of each local region, or using the skin color region data and the variance of the luminance signal over the predetermined period. In this case, the decision can be applied to only a singular region of the input image signal, for example, a bright portion of a dark image as a whole, a dark portion of a bright image as a whole, or a minute portion of a flat image as a whole.

Further, when performing compression and decompression in the level direction before coding, the coding noise which occurs due to coding can be reduced by previously reducing the gradation of a signal of a portion to which human eyes are sensitive.

As described above, according to the eleventh embodiment, in the image coding method of the ninth embodiment, the color space vector frequency is used as the local image feature data instead of the block average chrominance level. Thereby, a portion where the coding noise is conspicuous can be locally suppressed by utilizing the human visual characteristics to each data, while minimizing the influence on the coding rate.

APPLICABILITY IN INDUSTRY

As described above, according to an image coding method, an image coding and decoding method, an image coding apparatus, and an image recording and reproduction apparatus of the present invention, the quantity of generated codes can be precisely controlled for each local region by utilizing statistical data of the whole image, and generation of coding noise can be controlled. Therefore, these methods and apparatuses are very useful to achieve high-seed and simple processing, and suppress generation of coding noise.

What is claimed is:

1. An image coding method comprising:

dividing an input image signal corresponding to an image into image signals corresponding to individual local regions of the image;

deciding a filter characteristic for each local region of the input image signal on the basis of image feature data of each local region;

performing adaptive filtering; and coding the input image signal for each local region;

wherein the filter characteristic decided for each local region is compensated by comparison between itself and that obtained by averaging filter characteristics of plural local regions adjacent to a target local region.

2. An image coding method comprising:

dividing an input image signal corresponding to an image into image signals corresponding to individual local regions of the image;

deciding a filter characteristic for each local region of the input image signal on the basis of the frequency distribution of image feature data of each local region over a predetermined period;

performing adaptive filtering; and coding the image signal for each local region on the basis of the decided filter characteristic;

wherein the filter characteristic decided for each local region is compensated by comparison between itself and that obtained by averaging filter characteristics of plural local regions adjacent to a target local region.

3. An image coding method as described in claim 1, wherein the image feature data of each local region is at least one of the following data: an average of an absolute difference in luminance signals between adjacent pixels, an average of an absolute difference in color-difference signals between adjacent pixels, a value of an average luminance signal, a value of an average color-difference signal, a variance of a luminance signal, a variance of a color-difference signal, a value representing an amount of motion, and representative vector data in color space.

4. An image coding method as described in claim 1, wherein the filter characteristic is adaptively decided according to the image feature data of each local region and a control signal supplied from outside.

5. An image coding method as described in claim 4, wherein the control signal supplied from the outside is at least one of the following values: an accumulated value of an absolute value of frame or field pixel difference over an N (N: natural number) frame period of the input image signal, an accumulated value of a quantity of coded data over an M (M: natural number) frame period, and a ratio of a quantity of coded data in each frame.

6. An image coding and decoding method for coding image feature data of each local region, in an image coding method described in claim 1, further comprising:

recording a coded data sequence; and at a time of reproduction, decoding the coded data sequence, and subjecting each local region of the decoded image signal to adaptive filtering on a basis of the image feature data of the decoded local region.

7. An image coding method as described in claim 2, wherein the image feature data of each local region is at least one of the following data: an average of an absolute difference in luminance signals between adjacent pixels, an average of an absolute difference in color-difference signals between adjacent pixels, a value of an average luminance signal, a value of an average color-difference signal, a variance of a luminance signal, a variance of a color-difference signal, a value representing an amount of motion, and representative vector data in color space.

8. An image coding method as described in claim 2, wherein the filter characteristic is adaptively decided according to the image feature data of each local region and a control signal supplied from outside.

9. An image coding method as described in claim 8, wherein the control signal supplied from the outside is at least one of the following values: an accumulated value of an absolute value of frame or field pixel difference over an N (N: natural number) frame period of the input image signal, an accumulated value of a quantity of coded data over an M (M: natural number) frame period, and a ratio of a quantity of coded data in each frame.

10. An image coding and decoding method for coding image feature data of each local region, in an image coding method described in claim 2, further comprising:

recording a coded data sequence; and at a time of reproduction, decoding the coded data sequence, and subjecting each local region of the decoded image signal to adaptive filtering on a basis of the image feature data of the decoded local region.

* * * * *